Oct. 4, 1960    G. WILKESMANN    2,954,805
CARPET LOOMS

Filed Dec. 20, 1955    10 Sheets-Sheet 1

Inventor:
Günter Wilkesmann
By: Michael S. Striker
agt.

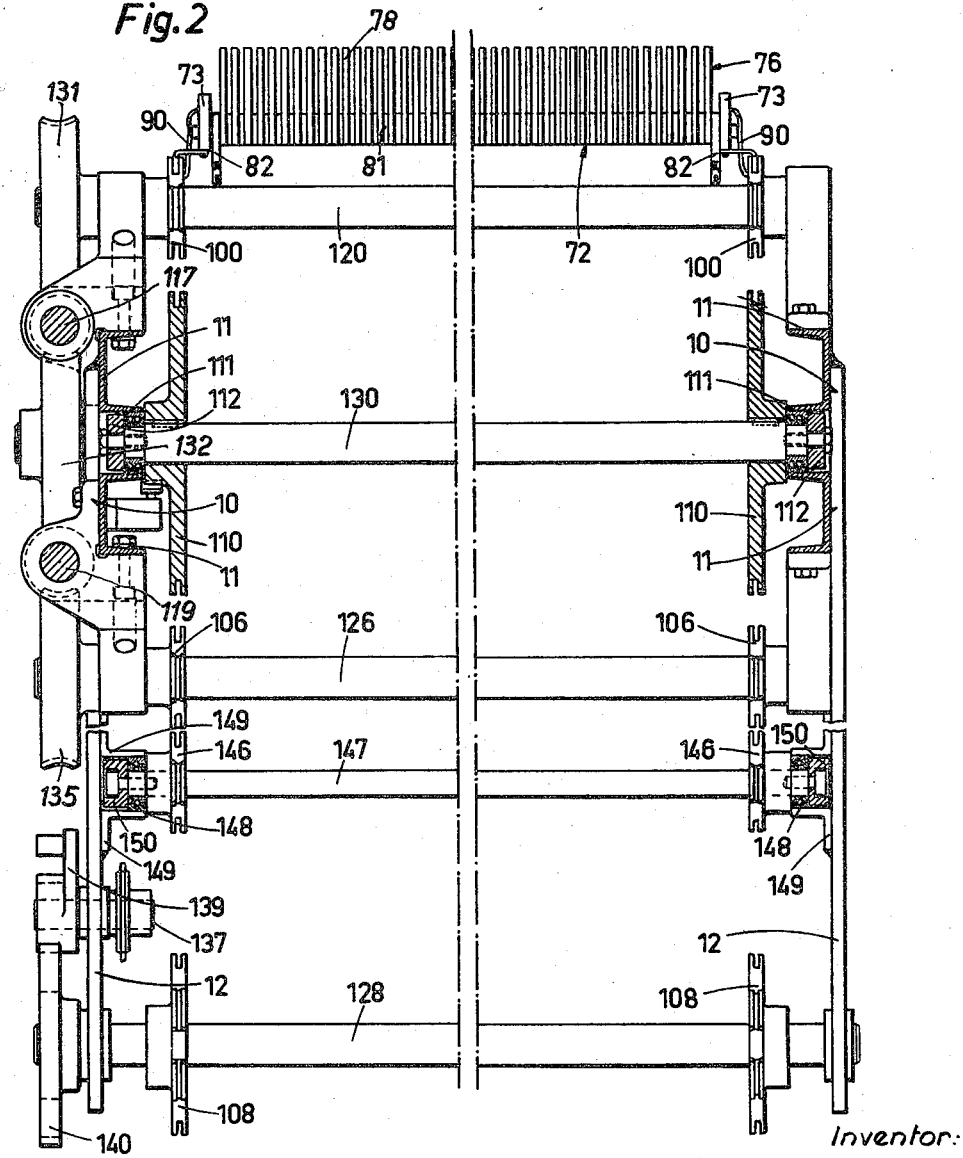

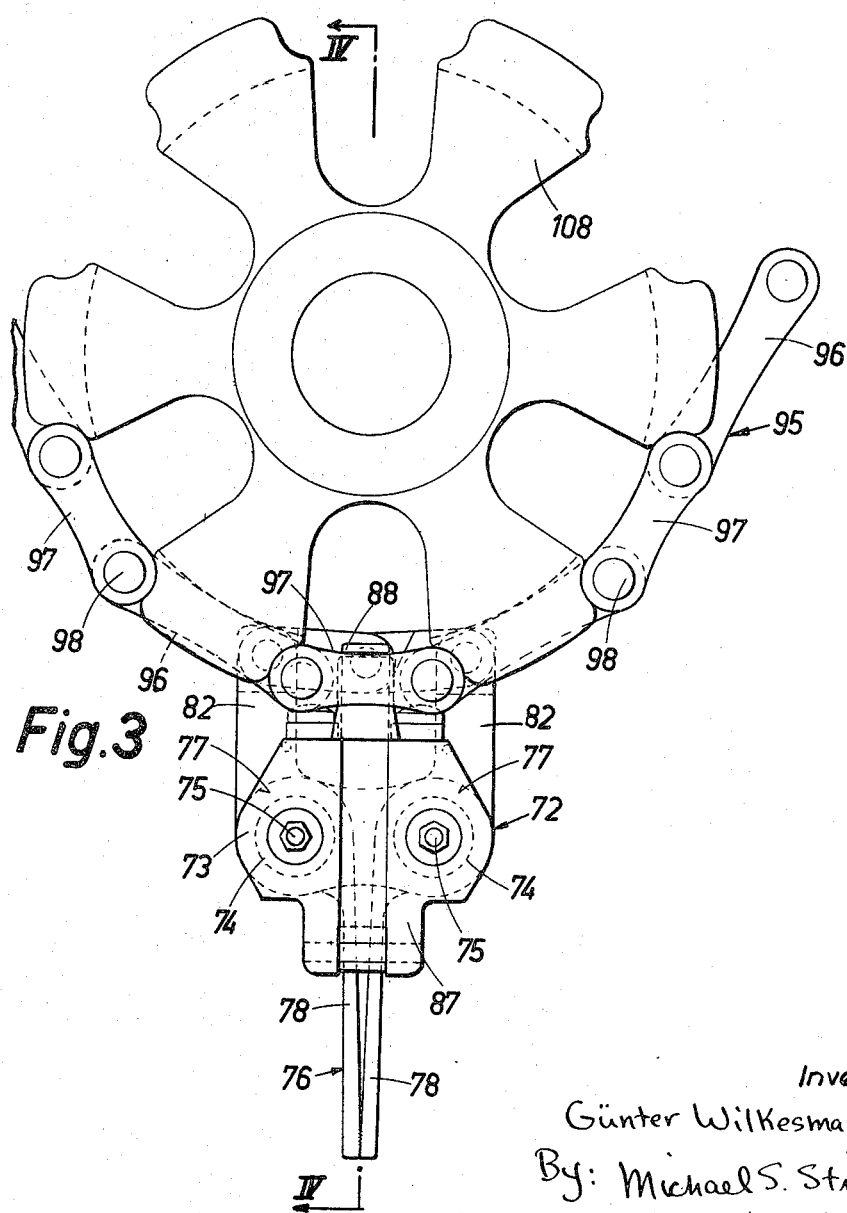

Oct. 4, 1960   G. WILKESMANN   2,954,805
CARPET LOOMS
Filed Dec. 20, 1955   10 Sheets-Sheet 6
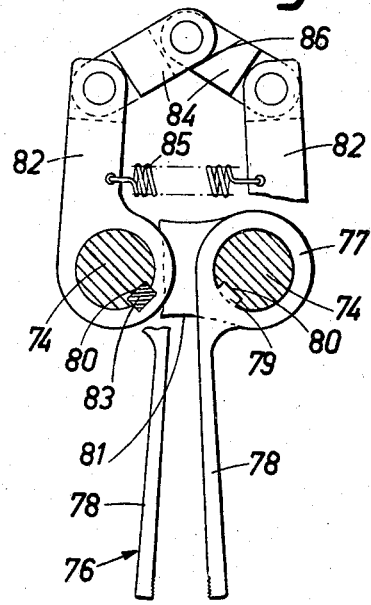
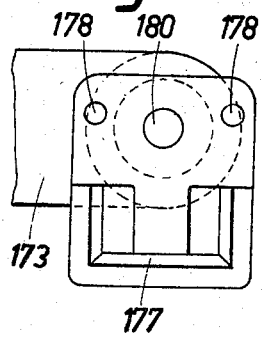
Inventor:
Günter Wilkesmann
By: Michael S. Striker
    agt.

Oct. 4, 1960  G. WILKESMANN  2,954,805
CARPET LOOMS
Filed Dec. 20, 1955  10 Sheets-Sheet 7
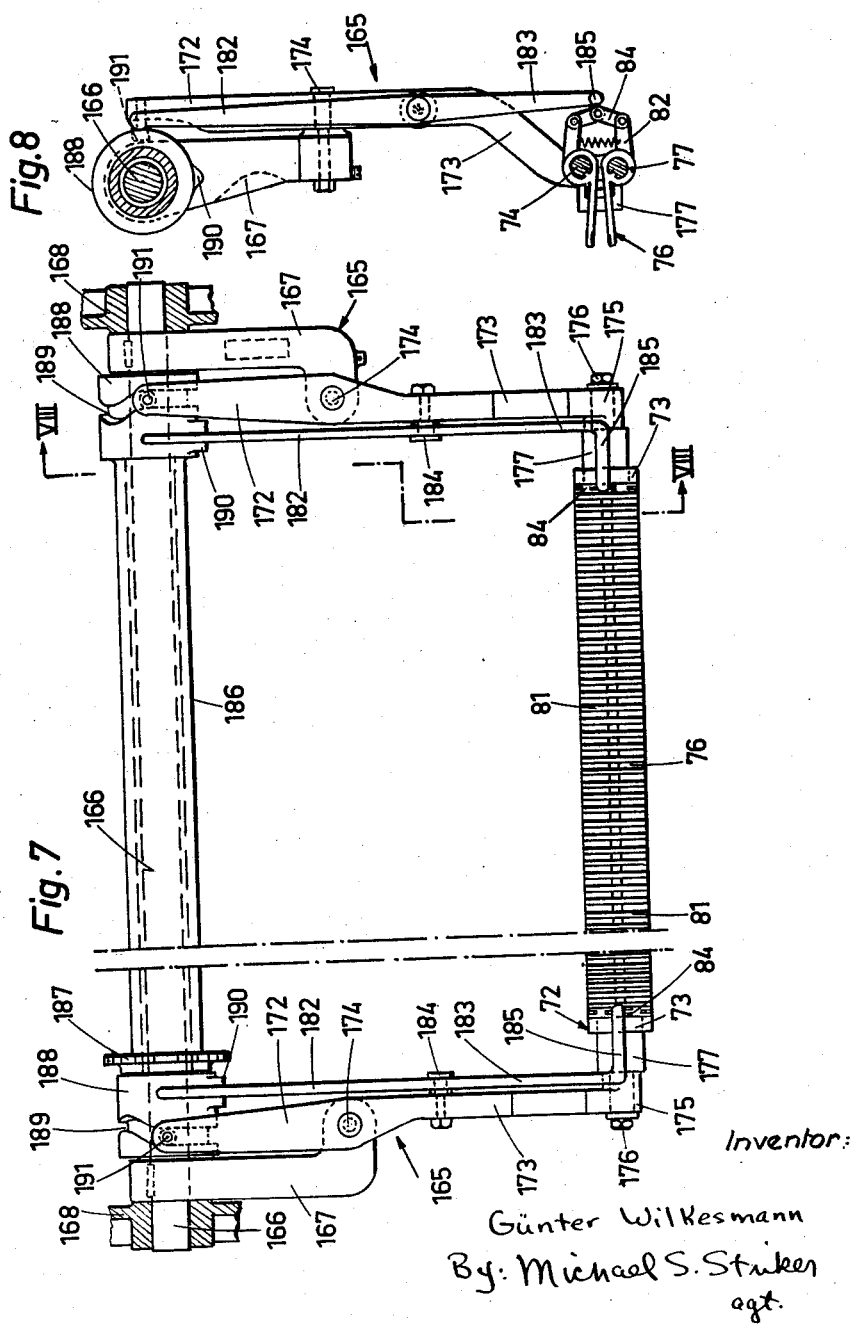
Inventor:
Günter Wilkesmann
By: Michael S. Striker
agt.

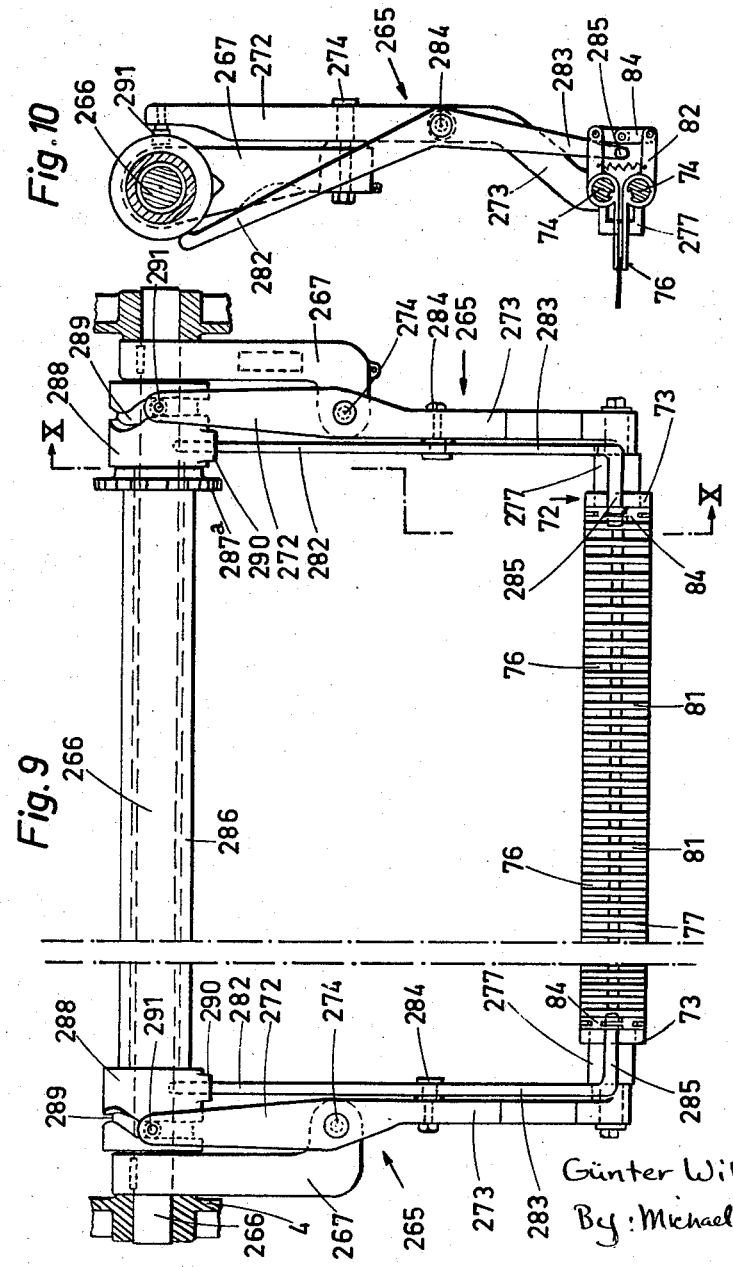

Oct. 4, 1960  G. WILKESMANN  2,954,805
CARPET LOOMS

Filed Dec. 20, 1955                                     10 Sheets-Sheet 9

Inventor:
Günter Wilkesmann
By: Michael S. Stuker
agt.

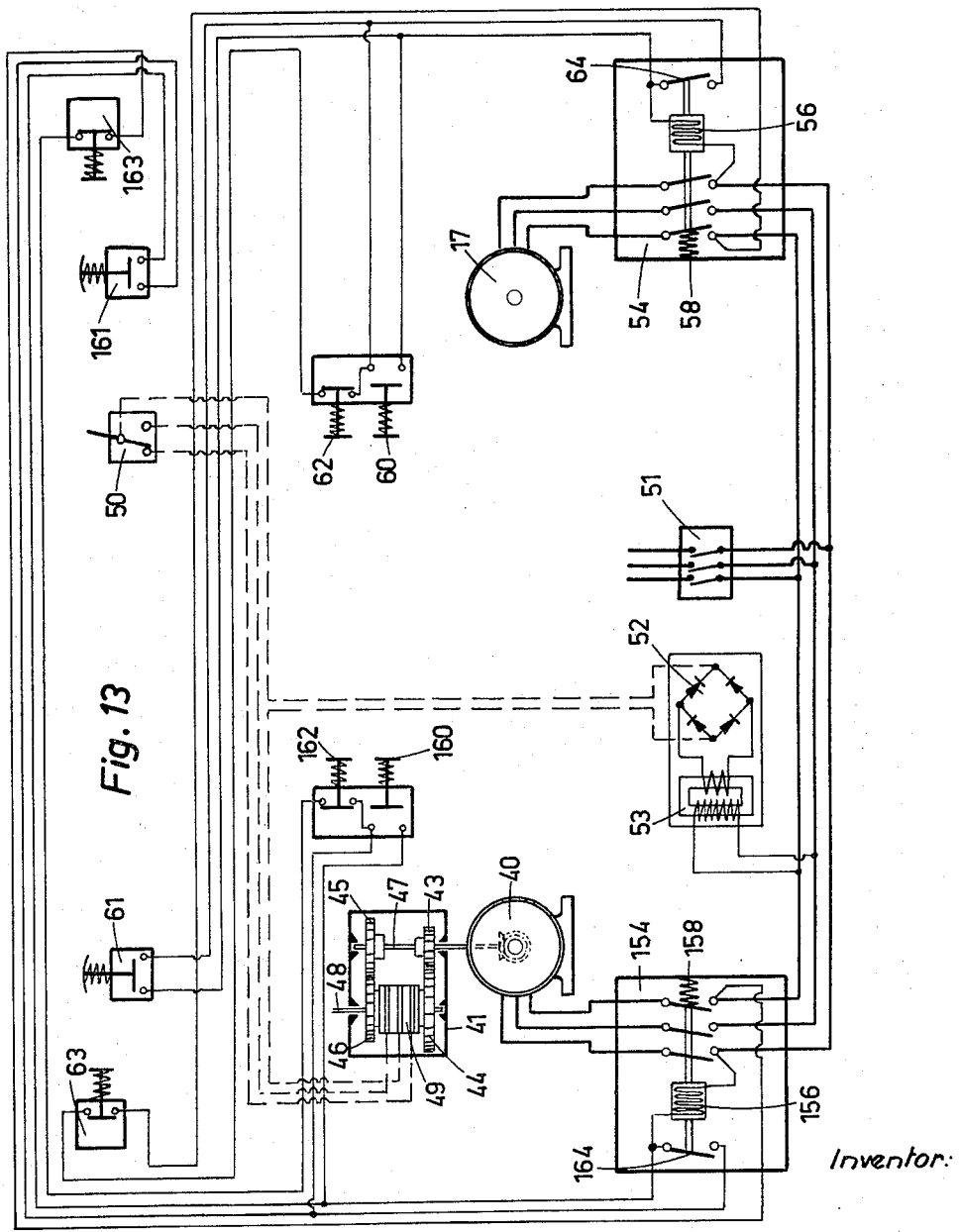

United States Patent Office 2,954,805
Patented Oct. 4, 1960

2,954,805

CARPET LOOMS

Günter Wilkesmann, Wuppertal-Barmen, Germany, assignor to Erich Mittelsten Scheid, Wuppertal-Barmen, Germany Filed Dec. 20, 1955, Ser. No. 554,322

Claims priority, application Switzerland Nov. 30, 1955

32 Claims. (Cl. 139—8)

This invention relates to an apparatus for the manufacture of carpets figured by the insertion of rows of tuft yarn, particularly Axminster carpets.

These carpets are often manufactured with the loom known as the Jacquard gripper carpet weaving loom, in which the tuft yarns are selected according to the pattern, taken up by grippers and inserted in the fell of the fabric being manufactured. The frame of the weaving loom has a gripper filling or charging device at the top which selects the tuft yarns in accordance with the pattern to be produced and presents the selected yarns to the grippers, so that these can take hold of them. This device has a row of yarn carriers which move up and down and hold a number of yarn guides, one above the other, corresponding to the number of different colours which will be used at any time. The ends of the tuft yarns from bobbins on a bobbin creel set up behind the weaving loom are taken into the yarn guides. The yarn carriers are each connected with a hook of a Jacquard machine which, for each working operation of the weaving loom, moves the yarn carriers in such a manner that the tuft yarns required at any time are held out to the grippers which are arranged in a row. The row of grippers is carried by a pair of levers which can swing in the vertical plane on the frame of the weaving loom. This takes the grippers alternately to the removal point of the filling or charging mechanism, where they take up a row of tuft yarns, and to the weaving position on the loom, where they insert these tufts into the warp which forms the weaving shed. The gripper weaving loom is of a relatively simple construction. The preparatory operations for making the yarn ready are also simple, because all the bobbins supplying these threads need to be wound with only one yarn each. There is a substantial drawback to the gripper weaving loom, however, in its relatively low output in quantity, the chief cause of this being the very long time taken by the grippers for their operation. The filling of the grippers with tuft yarn lengths and the laying of these tufts into the fell of the carpet are two successively occurring processes between which the grippers have to travel a long distance from one point of operations to the other. Since the operation of the grippers is incorporated in its entirety in the cycle of operations of the weaving loom, this cycle is lengthened considerably, which explains the low output of the gripper loom.

A higher quantitative output, however, is possible when manufacturing carpets on the spool Axminster carpet loom. In spool Axminster loom the tuft yarns are taken from a number of spools; one for every row of tufts across the width of the carpet in one repeat of the pattern. Preparatory to weaving, these spools are wound with a series of various coloured yarns according to the pattern to be produced, the number of ends corresponding to the number of tufts across the width of the carpet. The spools which are mounted in a spool frame, each with a row of thread guides, are removably held by means of these frames in the sequence in which their rows of yarn appear in the complete pattern, in a conveyor device consisting of a pair of endless link chains. The conveyor chains, which for each cycle of loom operations are moved on by the amount of the center distance between two spool frames, bring the spool frames singly, one after the other, into the vicinity of the weaving point. Here, by a system of swinging levers on the weaving loom, one spool frame at a time is removed from the conveyor and transferred down to the weaving point for the ends of a row of tuft yarns to be inserted in the warp. When the ends of the yarn have been fastened in the fabric, a measured length is unwound from the spool and then cut off, whereupon the levers swing back and replace the spool frame in the conveyor chains.

There is thus a fairly big hindrance to any big output by the spool loom in that, for each tuft row in the pattern repeat, a separate, individually wound, spool of yarn and the spool frame which holds this and the corresponding thread guide is required. If the pattern repeat is long there is an extraordinarily high number of spools and spool frames. The endless link chains in the conveyor mechanism must accordingly be of a very great length. The conveyor mechanism thus becomes very cumbersome and heavy, taking up a great deal of room and requiring a high power consumption for its drive. Moreover the preparatory operations with the spool loom are very complicated and take up too much time. An extremely large number of spools have to be wound with a series of various coloured yarns, depending on the length of the pattern and all these spools have to be inserted individually in a spool frame on the conveyor mechanism. When the spools have been wound according to a pattern, these spools are available for manufacture of that carpet pattern only. When another pattern has to be woven it is necessary to change all the spools on the conveyor mechanism for other spools which have been wound with yarn in accordance with the new pattern. For this reason and also because of the lengthy and complicated operation of winding the spools, it is only economic to work with a spool loom if large quantities are to be manufactured, i.e. a very large number of carpets, one after the other, of the same pattern and the same size. Finally, with the spool loom, there is a considerable wastage in tuft yarn since, when the required amount of carpets of the same pattern has been manufactured, there is a long length of yarn left over, partly on the spool and partly in the thread guides in each spool frame and this cannot be used.

Substantially the same drawbacks are found in a variant of the spool Axminster loom, known as the spool gripper Axminster loom. The spool gripper loom is the same as the spool loom to the extent that there are two endless chains constituting a conveyor system which holds a number of spools each wound with a series of different coloured yarns and corresponding in number to the number of rows in a complete pattern, the spools being held in spool frames fixed to the conveyor chains. It differs from the spool loom, however, in that, while the tufts are being inserted in the fabric, the spool frames remain on the conveyor chains. On the weaving loom is a row of grippers which is carried by the pair of swing levers and moves back and forth between the conveyor device and the weaving point. The grippers each hold the end of a yarn on the spool and pull a measured length of the yarn off the spool. Thereafter the pulled-out lengths of yarn are cut off, the cut-off pieces of yarn are inserted in the fabric being woven, and the grippers are then swung back.

The present invention aims at providing an apparatus for the manufacture of carpets, especially Axminster carpets, patterned by the insertion of rows of tufts, which on the one hand, eliminates the aforementioned disadvantages of the gripper loom and also those of the spool loom and the spool gripper loom, while on the other hand combines their essential advantages, in particular simplicity of construction and high quantitative output.

The carpet weaving apparatus of the invention comprises, in addition to a carpet weaving loom of the familiar construction, a mechanism for selecting the tuft yarns and for filling these yarns into grippers, arranged in rows, which mechanism corresponds essentially to the filling mechanism of the gripper loom and serves the same purpose, that is to say that like the latter it has a row of yarn carriers which can be adjusted according to the pattern by means of a Jacquard machine. In the new apparatus however, the filling mechanism need not be situated on the frame of the loom but can be mounted separately from it. In the arrangement according to the invention the filling device is connected with the weaving loom by means of a conveyor mechanism (consisting, for example, of a pair of endless chains) which includes a number of rows of grippers disposed at regular distances. This conveyor device, on the one hand, conveys the rows of grippers from the filling mechanism to the weaving loom in the order in which they are filled with tuft yarns according to the pattern and, on the other hand, after these yarns have been inserted in the fabric under manufacture, the conveyor returns the emptied rows of grippers to the filling mechanism for refilling.

Preferably each row of grippers is on a carrier (in the form of a frame, for example) which can be removed from the conveyor, both at the filling point and at the weaving loom, in one case for the grippers to be filled with yarn and in the other for the yarn held by the grippers to be inserted in the fabric. After filling and giving up the yarns respectively, the gripper frames are replaced in the carrier mechanism. The removal of the gripper frames and their transfer to the filling and weaving points, respectively, can be effected by means of lever systems at the filling mechanism and at the weaving loom, constructed on the same lines as the familiar system in the spool weaving loom which removes the spool frames from the conveyor chains, brings them to the weaving point and then replaces them in the chains.

By comparison with the known gripper loom, the construction according to the invention offers the possibility of a higher productive output of the loom. While, as already mentioned, in the gripper loom the filling of the grippers and the insertion of the yarn held by the grippers into the fabric are two processes which are interposed successively into the operation of the weaving loom, in the new arrangement, the filling of the gripper frames is a separate process from the cycle of operations of the weaving loom, which only depends on the operation of the latter to the extent that, for each of the loom cycles one row of grippers has to be filled. This filling process, however, can take place at any point during the loom cycle of operations, for example at the same time as a row of tufts is being inserted in the fabric. The insertion of the tufts in the fabric from the grippers is now the only process belonging to the cycle of operations of the weaving loom. This takes only a relatively short time, particularly as the row of grippers has only a short distance to travel between the conveyor and the weaving loom and back. This reduces the cycle of operations of the weaving loom by a considerable amount and thus increases the productive output of the loom substantially, as will be immediately realised.

When the above differences are considered it will be seen that the apparatus of the present invention is characterised by the fact that the filling of the grippers is independent of the cycle of operations of the loom, that a number of rows of grippers travels in a continuous circuit from the filling device to the weaving loom and back again to the filling device and, at the filling device, one row of grippers after the other is filled with tufts, while at the weaving loom one row of grippers after the other lays the tufts which it holds into the fell of the fabric being woven.

Moreover, by comparison with the known spool loom and the spool gripper loom, there is the advantage of a greater simplicity of construction. It is true, of course, that in the construction according to the invention there is a larger number of rows of grippers, or gripper frames, and a conveyor system to hold them. The number of rows of grippers, however, is independent of the number of rows of tufts in the repeat of pattern and therefore may be substantially smaller than the number of spool frames in the spool and spool gripper looms just mentioned. Thus, it need only amount to a fraction of the number of tuft rows in the pattern. This means also that the conveyor system is much shorter and lighter. It takes up less space and requires only a moderate power consumption for its action.

Another advantage of the arrangement according to the invention is that the winding of a very large number of spools with rows of different coloured tuft yarns, which is necessary in the spool loom and the spool gripper loom, becomes superfluous. Thus the preliminary operations for preparing the tuft yarns are just as simple as in the well-known gripper loom, since the yarns are supplied from bobbins each wound with only one thread. When changing to a different carpet pattern it is not necessary to change the bobbins supplying the yarns because the yarns for the new pattern can be taken from the bobbins already there. Only the Jacquard cards determining the selection of the yarns need to be changed. Thus it is not essential to manufacture large quantities of similar carpets since smaller quantities can also be manufactured economically. Furthermore, it is possible in case of need, to make a temporary interruption in the manufacture of a fixed quantity of carpet patterns so that in the meantime a few carpets of a different pattern can be produced. Finally, there is no wasting of the yarn, because when a bobbin becomes empty the new yarn can be tied to the end of the old yarn in the filling device.

While the existing gripper loom is brought to a stop not only by breakdowns in the loom itself but also has to be stopped in the event of a broken thread or empty bobbin in the filling mechanism, in the arrangement according to the invention there is the advantage that it is possible, on one hand in the case of stoppage of the filling mechanism through some defect to allow the weaving loom to continue running, while on the other hand, if the weaving loom has to stop on account of a defect it is possible to let the filling mechanism continue to operate. To bring this about the conveyor device in the arrangement of the invention is so constructed that the section of it which conveys from the filling system to the weaving loom constitutes a reservoir or depot for the storage of filled rows of grippers and the section conveying from the weaving loom to the filling device forms a reservoir or depot for the storage of emptied rows of grippers. The reserve of filled rows of grippers in the one depot enables the weaving loom to continue while the filling mechanism is stopped, in which case the empty gripper rows coming from the weaving loom are stored up in the second depot to be filled up later on with tuft yarn so as to build up a new store of filled grippers. In order that the re-establishment of this reserve may be performed as rapidly as possible after the filling mechanism is restarted, the drive of the filling mechanism, which is separate from the weaving loom, is preferably arranged to operate either at the same or at a higher speed than that of the loom. Changing from one speed to the other is preferably effected automatically in connection with the conveyor device. It will readily be seen that the fact that, in the event of defects in the filling mechanism, the weaving loom continues to run for so long as the supply of filled gripper frames lasts, offers the great advantage that the drop in production resulting from an enforced stoppage of the weaving loom is considerably lessened by comparison with the existing gripper loom, which again increases output very considerably.

In order that the invention may be more readily understood, reference is made to the accompanying drawings which illustrate diagrammatically and by way of example one embodiment thereof, and in which:

Fig. 1 and Fig. 1a are portions of a side view of the complete machine;

Fig. 2—upper part—is a section through the conveyor device along line II—II of Fig. 1a in the direction of the arrows, and the lower part—is a plan view, partly in section, taken in the direction of the arrow IIa of Fig. 1;

Fig. 3 is a side view drawn on a larger scale of part of the conveyor chain with a gripper frame in contact with it;

Fig. 5 is a section, partly along line V—V and partly along the line Va—Va of Fig. 4;

Fig. 6 is an elevation of a claw for holding the gripper frame (the same claw is also shown in section in Fig. 4);

Fig. 7 is an elevation of a lever system for the filling machine, its purpose being to take a gripper frame for filling out of the conveyor, viewed from the side which is turned away from the filling machine;

Fig. 8 is a section along line VIII—VIII of Fig. 7;

Fig. 9 is an elevation of a second lever system for the loom, the purpose of which is to remove from the conveyor a filled gripper frame for the transfer of the tuft yarn to the weaving loom;

Fig. 10 is a section along line X—X of Fig. 9;

Fig. 13 is an electric circuit diagram.

Figure 1:
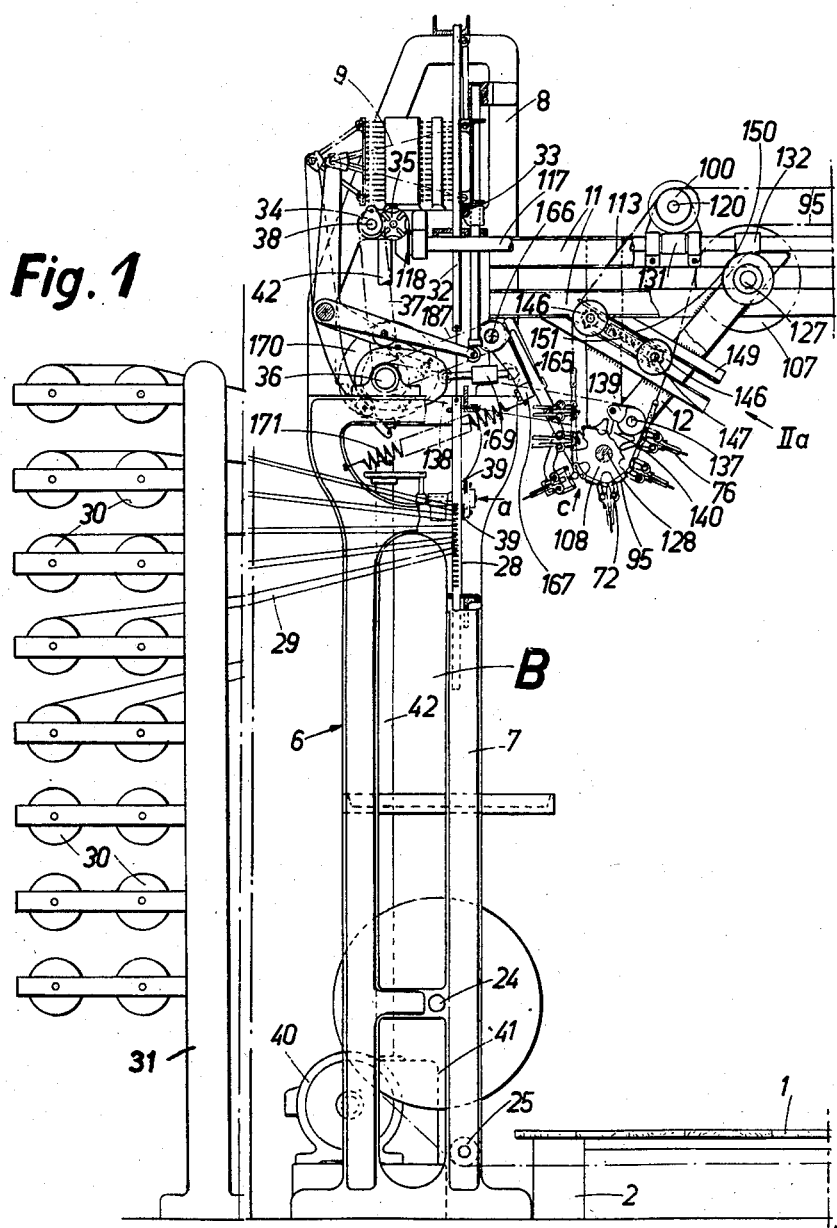
Figure 1A:
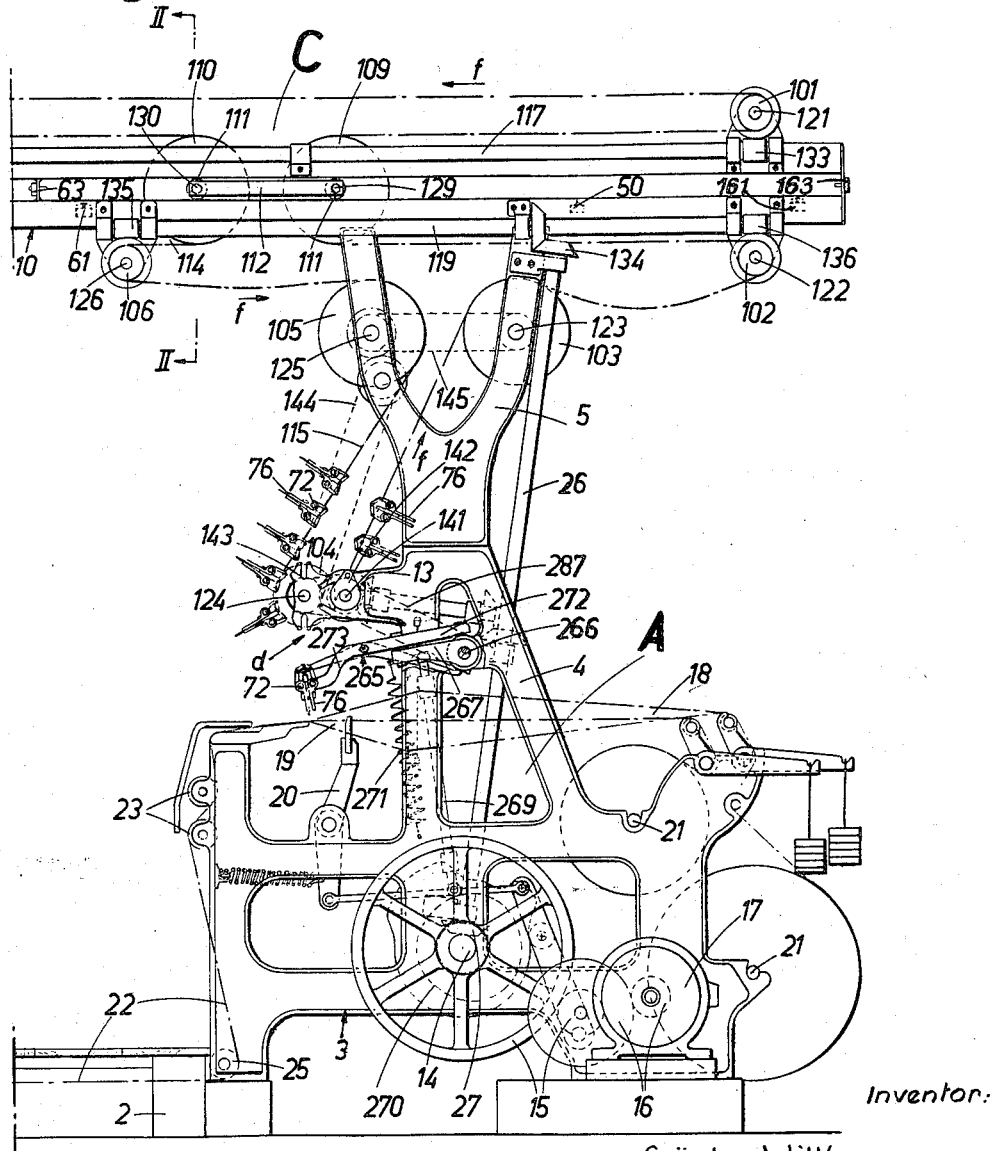

The equipment for the production of Axminster carpets, shown in its entirety in Figs. 1 and 1a consists essentially of three connected machines, viz. a carpet weaving loom A, a device B for filling grippers, arranged in rows, including a device for selecting the tuft yarn according to the pattern and passing them to the grippers, and a conveyor device C, which in one action conveys the filled rows of grippers to the weaving loom A, close to the weaving position, and in the other action transfers the emptied rows of grippers back to the filling device. The weaving loom and the filling device for the grippers are so distanced and arranged that the service side of the loom A is turned towards the filling device B, while the latter has the side on which the yarn tufts are passed to the grippers facing towards the weaving loom. The distance between the weaving loom and the filling device is such that there is enough space between the two for the weaver who is operating them. The weaver stands on a slightly raised platform 1 which rests on feet 2. The frame 3 of the weaving loom A consists principally of two rigidly joined side frames 4, one of which can be seen in Fig. 1a. Each of the side frames 4 has a forked bracket 5 at the top. The frame 6 of the filling device also has two rigidly joined side frames 7, one of which is shown in Fig. 1. This carries at the top the frame 8 of a Jacquard machine 9 which controls the filling device. The conveyor device C is supported mainly by a crossbar 10 extending from the frame of the Jacquard machine 8 to the weaving loom and projecting beyond the two brackets 5 at the top of the frame of the weaving loom. The crossbar 10 consists of two rigidly joined longitudinal girders 11 each made up of two profile iron members. The girders 11 are fixed to the frame 8 of the Jacquard machine at the end facing the filling device B while the part above the weaving loom is supported and fixed to the brackets 5. Each of the crosspiece girders 11 has an arm 12 pointing downwards adjacent the filling mechanism B. Additional support for the conveyor is provided by the two forked brackets 5 and the frame of the weaving loom 3 which, for this purpose, has two arms 13 on the side frame 4, directed towards the operating side of the loom.

The main shaft 14 of the weaving loom is supported in the side frames 4 and is coupled by means of gear wheels 15, 16, to an electric driving motor 17 mounted beside the loom. From the main shaft 14, by means of appropriate cams and eccentric sheaves together with an arrangement of compound levers, the members of the loom which perform the weaving process are actuated, e.g. the shafts which set the warp threads 18 for the formation of the weaving shed 19, the sley 20 which beats up the weft in the shed. Further, according to the construction of the loom, the main shaft provides the driving power for the picker which drives the shuttles (or shuttle) through the shed formed by the warp threads, or the power for a device actuating the needles which insert the weft. The warp threads are fed in from two warp beams 21 which are situated at the back in the loom frame 3. The finished carpet material 22 is passed through rollers 23 and guided by the roller 25 under the weavers platform 1 and on from there to a cloth roller 24 situated at the bottom of the frame 6 of the filling device B, where it is wound into a roll. All the mechanisms of a weaving loom which have been referred to are familiar to an expert and it is therefore unnecessary to illustrate or describe them in detail. The usual looms for producing Axminster carpets can be referred to.

It may be mentioned here that in the frame of the weaving loom A is an upright shaft 26 which is rotated by the main shaft 14 through a pair of bevel gear wheels 27. The upright shaft 26 transmits the drive for a part of the conveyor device C and for a lever system which removes each row of grippers as it arrives over the weaving position and transfers it from the carrier to the weaving point. This lever system will later be described in detail in connection with the conveyor mechanism.

The device B which selects the tuft yarns and feeds them to the grippers has a row of thread carriers 28 which move vertically up and down and have a number of yarn guides, e.g. small tubes, disposed at short intervals one above the other and corresponding in number to the number of different coloured yarns to be worked at any time. The yarns are supplied from yarn bobbins 30 mounted in a creel placed behind the filling device B. Each yarn guide contains the end of a yarn slightly projecting at the front. For each process of filling a row of grippers, the yarn guides are set by the Jacquard machine 9 at the top of the frame 6, according to the pattern in the carpet, to the withdrawal point indicated by the arrow a in Fig. 1. For this purpose each yarn carrier 28 is connected with a hook 32 on the Jacquard machine which can be moved vertically up and down. The hooks 32 are moved upwards by the up and down movement of the lifting blade 33 on the Jacquard machine, the extent depending on the appropriate adjustment of the drivers with which they are fitted. The drivers are adjusted by the familiar Jacquard machine devices, regulated by the punched cards known as Jacquard cards. These punched cards are laced together so as to form an endless strip. This passes over what is known as a card cylinder which is rotated by steps by means of a Geneva drive 34, 35. All the operations of the Jacquard machine are derived from a horizontal main shaft 36 at the head of the machine frame 6 the shaft carrying the eccentrics and cams or eccentric sheaves necessary for this, while, by means of a chain drive 37, it drives the shaft which carries the operating arm 34 of the Geneva drive at a speed corresponding to the speed of the main shaft. At the withdrawal point $a$ of the yarns is a shears consisting of two knives 39 which move in opposition to each other and which serve to cut off the ends of the yarn to form the tufts after they have been seized by the grippers and pulled a short way out of the yarn guides. The knives 39 are operated by a cam on the main shaft.

All the mechanisms in the selecting and filling system are known and familiar to experts and it is unnecessary, therefore, to illustrate or describe them in detail. Reference can be made to existing gripper looms for Axminster carpets for details of their selecting and filling mechanisms. It may be mentioned, however, that the filling device also provides the drive for a part of the conveyor device C for the grippers as well as a system of levers, the function of which is to remove the rows of empty grippers as they come from the conveyor and to set them at the point $a$ from which the yarn tufts are withdrawn. This lever system will later be described in greater detail in connection with the conveyor device.

An electric motor 40 at the foot of the machine frame 6 drives the filling mechanism, its shaft being coupled, through a change speed gear housed in a gear case, with a vertical shaft 42 situated in the frame 7 and of which the upper end—broken off in the drawing—is connected to the horizontal main shaft 36 by means of a pair of bevel wheels. The change speed gear, which is indicated generally by 41 makes it possible to set two different speeds for the main shaft 36 of the filling device so that this can run either at the same speed as the main shaft 14 of the loom A (normal speed) or at an increased speed, this being most suitable when it is about 20% higher than the loom shaft 14. The gear 41 is shown in the circuit diagram of Fig. 13. It consists of two pairs of gear wheels 43, 44 and 45, 46 with a different gear ratio. One wheel of each pair is fixed to a shaft 47 coupled to the motor 40, while the other wheel of each pair is rotatably mounted on a shaft 48 which is connected to the vertical intermediate shaft 42. An electromagnetic clutch 49 placed between the wheels 44, 46 makes it possible for either the wheel 44 of the pair 43, 44 or the wheel 46 of the pair 45, 46 to be coupled at will to the shaft 48. The two magnet coils for reversing the clutch 49 are controlled by a reversing switch 50 which, in one position switches on one coil and keeps it supplied with current while in the other position it switches on the other coil and supplies it with current. Thus, under operating conditions there is always one magnet coil supplied with current so that, according to the position of the reversing switch 50, the filling device B is driven either at the normal speed or at the increased speed. The current for the two magnet coils of the change speed gear 41 is taken from a transformer 53 through a full-wave rectifier 52 when a main switch 51 is closed. Change speed gears with an electro-magnetic clutch are well known and will be familiar to experts so there is no need for a description and illustration of the details.

The circuit diagram (Fig. 13) referred to above in connection with the change speed gear 41 also shows that, for the connection and disconnection of the two driving motors 17 and 40 of the weaving loom A and the filling mechanism B, respectively, there is for each motor an electro-magnetically controlled switch 54 or 154 (main switch) respectively. The switches 54 and 154 are so designed that they are closed and kept in the closed position by means of a magnet coil 56 and 156, respectively, while the opening of the switch is effected by a force storage device, e.g. spring loading, 58 or 158 respectively. The circuits of the magnet coils 56, 156 are each controlled by means of several regulating switches, some of which are operated by hand whilst others are set mechanically in a way which will be described subsequently in connection with the conveyor device.

The control of the on-off switch 54 for the weaving loom motor 17 will now be explained. There are four control switches for this, two for switching on, 60 and 61, and two for switching off, 62, 63. The two first-mentioned switches 60, 61 are normally open and are closed for a short time when they are operated. On the other hand, switches 62, 63 are normally closed and are opened for a short time when operated. The four switches are so disposed in the circuit of magnet coil 56 that the two normally closed switches 62, 63 are in series with one normally open switch 60. The other normally open switch 61 is in parallel with switch 60 so that the contacts of switch 60 can be bridged by it. This switching arrangement can also be designated so that the two normally opened switches 60, 61 are connected in parallel with each other but, in common, are in series with the normally closed switches 62, 63. The circuit of the magnet coil 56 is also influenced by an auxiliary switch 64 on the main switch 54 itself, which is in parallel with the two normally open switches 60, 61, so that the two switches referred to can be bridged over thereby. The auxiliary switch 64 is open when the main switch is open and closed when the main switch 54 is closed, so that the magnet coil 56 which is switched on by one of the switches 60, 61 is kept supplied with current by this auxiliary switch and the switch 54 is thus kept closed.

If, with the main switch 54 open, one of the two switches 60 or 61 is operated, this closes the circuit of the magnet coil 56, whereby the switch 54 is closed and the motor 17 is thus switched on. At the same time the auxiliary switch 64 closes so that the main switch remains in the on position. If, with the motor 17 switched on, one of the two switches 62 or 63 is operated, it interrupts the circuit of the magnet coil 56 so that the main switch 54 opens, while at the same time the auxiliary switch 64 is opened again.

For controlling the magnet coil 156 of the on-off switch 154 for the motor 40 driving the filling mechanism B there are similarly four control switches 160–163 and also an auxiliary switch 164 which opens and closes at the same time as the main switch 154. All these switches are arranged, with respect to the magnet coil and to each other, in exactly the same manner as the control and auxiliary switches 60–64 associated with the on-off operation of the loom motor 17 by switch 54. They are operated in exactly the same way so that it is unnecessary to describe them in detail again.

Switches 60, 62 and 160, 162 are hand-operated switches and are best designed for push button operation. Of these, 60 and 62 are situated on the frame of the loom and the other two 160, 162 on the frame of the filling machine. The remaining four switches 61, 63 and 161, 163 are assigned to the conveyor device C and are operated by the latter in a manner to be described subsequently.

It is obvious that both the weaving loom A and the filling device B are fitted with stop motions which automatically bring the loom or the filling device to a stop if a yarn breaks or a bobbin becomes empty. The stop motions, which are familiar to the expert, actuate small switches, through the above described arrangement, these being designed similarly to the controls 62, 63 and 162, 163 which open the circuits of the magnet coils 56 and 156 in that they also are closed when in the unoperated position. In the loom they are disposed in series with switches 62, 63 and in the filling device in series with switches 162, 163 and, when actuated, they interrupt the circuit of magnet coils 56 or 156 associated with the main switches 54 or 154 respectively, causing the latter to open.

In the usual gripper looms with the tuft yarn selector at the top of the loom, the transfer of the selected and cut yarn tufts from the selector to the loom is effected by a single row of grippers, carried by a pair of swing levers, but the arrangement in the invention uses a large number of rows of grippers which are conveyed in a continuous succession from the filling device B to the weaving loom A and from there back to the filling system. All the rows of grippers are the same and are constructed as follows:

Referring particularly to Figs. 3 to 5, 7 and 8, each row of grippers has a frame type carrier 72 consisting of two end or head pieces 73 and two shafts 74 joining them into a frame. These shafts are supported by their ends in the head pieces 73 so as to be capable of rotation and are fixed to these end pieces by means of a bolt 75 which is screwed through a hole in the head piece into a tapped hole at the end of the shaft. The two shafts 74 carry a number of grippers 76, corresponding to the number of tufts to be inserted in the fell of the carpet at the same time. These consist of two narrow fingers 78 with a flat eye 77, one of which is attached by the eye to one shaft and one to the other. The fingers 78 are connected to the shafts 74 so as to turn with it, one eye of each finger fitting into a longitudinal groove 80 in the coresponding shaft by means of an internal nose 79 (Fig. 5). Between the grippers 76 there are narrow distance pieces 81, each consisting of a sheet metal plate with two holes through which the two shafts 74 can pass. The distance pieces 81 simultaneously give transverse support to the shafts, protecting them from sagging.

On every carrier frame 72, between the first, or last gripper and the adjacent head piece 73 there is a device for opening and closing the grippers. Each of these devices has two single-armed levers 82, the boss of which is mounted on a shaft 74 and couples it to the shaft by means of a flat key 83 which engages in a slot 80 in the shaft and in an internal recess in the boss of the lever. Each opening and closing device also has a lever 84 which is articulated with one lever arm 82 by one of its limbs and with the other lever arm by the other limb, thus connecting the two levers to form a toggle. Finally, there is a tension spring 85 attached by its ends to the two levers 82. As can be seen, this spring tends to draw the two lever arms together and so to open the grippers 76. In the open position of the grippers the toggle levers of the two opening and closing devices are bent outwards. This bending motion is limited by the impact of one lever 84 against an abutment 86 on the other lever.

The grippers are closed by means of pressure exerted on the knee joint in the direction of arrow b (Fig. 5) which extends the bent lever 84 and, through a corresponding rotation of the two shafts 74 moves the lever arms 82 apart, but draws the fingers 78 of the grippers towards each other in the closed position. When the grippers close, the toggle levers are moved a little beyond the dead centre position with the result that there is automatic locking when the grippers are closed. Obviously the gripper fingers 78 are slightly flexible so as to be able to bend a little as the toggle lever passes through the dead centre position and when the toggle lever is beyond that position, to remain pressed firmly together. To open the grippers, the toggle levers are returned to the position of being bent outwards, through pressure exerted on the inner side of the toggle joint against the direction of arrow b (Fig. 5), which, in consequence of corresponding rotation of the shafts 74, moves the fingers 78 away from each other into the open position.

The two end pieces 73 of each gripper carrier frame 72 each have a projection 87, essentially rectangular, on the side where the fingers 78 of the grippers 76 are situated. The function of these projections is to provide a gripping surface for two levers, to be described later, which remove the gripper frame temporarily from the conveyor device, which will also be described later. On the side opposite to the gripper fingers 78, each head piece 73 has a flat tongue 88 which connects the gripper frame to the conveyor device. The latter has a number of pockets, to be described later, into which the tongues 88 are inserted, for which reason the tongues may also be referred to as flat plugs. The tongues, or flat plugs 88 are each formed by the shank of a flat metal angle bar standing perpendicular to the shafts 74, the other end of the angle piece being screwed to the corresponding head piece 73 at 89. Finally, the head pieces 73 of the gripper frames each have a disconnectable, spring loaded locking bar 90 acting as a safeguard against accidental release of the gripper frame from the conveyor mechanism. Each locking bar is made from a spring bar consisting of strong steel wire, the outer end 91 of which is bent out at right angles, while it is fixed by means of its inner end 92 into a slot 93 in the corresponding end piece. It is made fast by a pin 94 which crosses the slot 93 and passes through the eye-shaped end of the bar 92, while the bar is supported against one end of the slot 93.

The conveyor device C for the rows of grippers, or rather the frames 72 which hold them, consists essentially of two endless link chains 95 disposed parallel to each other at a distance corresponding to the length of the gripper frame 72. Each chain (see Figs. 3 and 4) has alternating long and short links 96 and 97 connected by link pins 98. The short links 97 each consist of two strips of flat-bar steel, the ends of which hold between them the ends of the long links, which consist of only one strip each. In this way, at each short link 97 of the two chains 95, there is formed a pocket 99 (Fig. 4) limited by the two metal strips forming the link and the adjacent end pieces of two long members 96. The pocket 99 serves for the insertion of the flat plug or tongue 88 of a gripper frame 72. The short links 97 of the two chains 95 are situated immediately opposite each other and one gripper frame 72 is slipped into each pair of opposite links by the insertion of its flat plug or tongue 88 into the pocket 99 formed by the short links 97. The locking bars constituted by the hooked spring bars 90 grip the back of the chain links 97 with their ends 91, thus protecting the frame 72 from being detached accidentally from the chains 95. It is evident from the foregoing description that the endless conveyor mechanism formed by the two chains 95 is continuously conveying an unbroken sequence of gripper frames 72, each holding a row of grippers 76.

The chains 95 of the conveyor mechanism are supported and driven by chain wheels 100—110, so disposed and similarly designed that there is always one wheel of one chain opposite another of the same size belonging to the other chain. Each pair of opposite chain wheels is fixed to a common shaft 120—130 so that they can be rotated at identical speeds. Most of the shafts bearing the chain wheels are fixed. They run partly in bearings fixed to the two longitudinal girders 11 of the crosspiece 10 and partly supported on the arms 12 of the crosspiece, in the brackets 5 at the top of the weaving loom 3, and on the arms 13 of the frame 3. The two remaining shafts 129 and 130 are supported on the longitudinal girders 11 of the crosspiece 10 so that they can be moved, the rollers 111 at the end, each constituted by the outer race of a ball bearing, moving in the gap which remains between the two channel irons of the bridge girders 11 (see Fig. 2). The two shafts 129, 130 are connected at their ends by two flat section bars 112, fitted on to the shouldered-down shaft ends by means of holes bored in the bars and retained in position by bolts screwed into the shaft ends. The two flat section bars coupled by the shafts 129, 130 constitute to some extent a carriage for the pair of chain wheels 109 and 110 which can travel along the length of the crosspiece 10. Since both the carrier chains 95 are driven together it will be enough to describe the action of one of them, viz the chain in the front in Figure 1.

Figure 11:
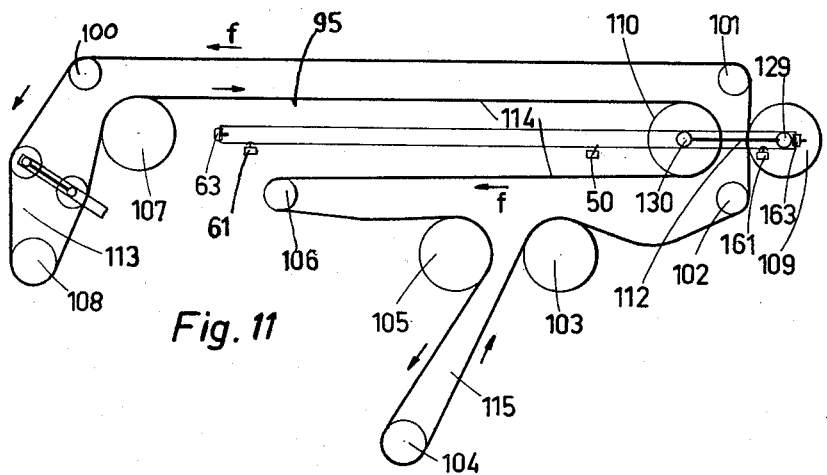
Figs. 11 and 12 are two diagrams showing the conveyor in two different positions of its components.
Figure 12:
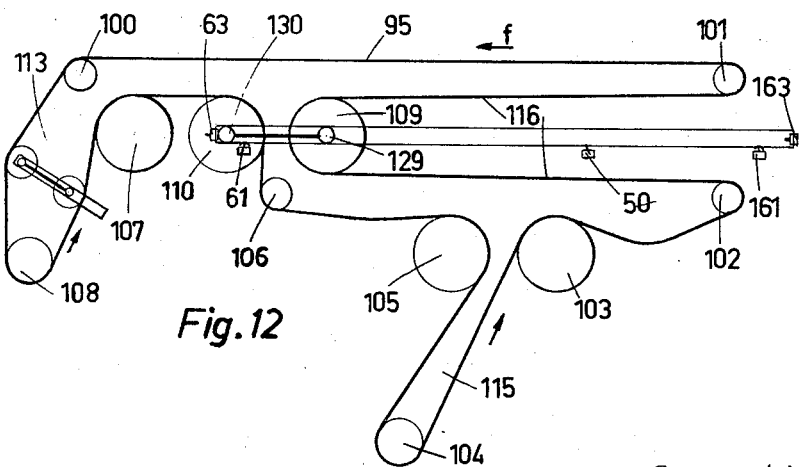

Commencing at the left-hand end of the crosspiece 10 it will be seen that the chain 95, which moves in the direction of the arrows f indicated in Figs. 1, 11, and 12, is first taken from the top left chain wheel 100 in the form of a U-loop 113 with the apex pointing downwards, round a chain wheel 108 at the lower end of the arm of the bridge 12, to a chain wheel 107 a little below wheel 100. From here it runs horizontally to the sliding chain wheel 110 on the left which it embraces, in the form of a horizontal loop 114, to pass on round a lower wheel 106, to a chain wheel 105 supported in the front of the bracket 5 of the weaving loom 3. The chain 95 then passes, in the form of a downward pointing loop 115, round a chain wheel 104 on the arm 13 of the weaving loom frame and on to a wheel 103 at the back of the bracket 5 of the weaving loom frame, then roughly horizontal to a chain wheel 102 underneath the right-hand end of the crosspiece 10. From here the chain is taken in the form of a horizontal loop 116 round the right hand sliding chain wheel 109 to a wheel 101 at the top right hand end of the crosspiece 10, from where it passes in a horizontal direction back to the chain wheel 100 where the description of the path of the chain was begun. The two horizontal loops, formed by means of the moving chain wheels 109, 110, have a function which will be explained later. They will therefore be ignored for the present.

Apart from the chain wheels 109, 110 which can be moved, all the wheels are mechanically driven, partly from the drive of the filling mechanism B and partly from the drive of the weaving loom A. The following arrangement brings this about: On the upper part of the crosspiece girder 11 is a horizontal shaft 117 in bearings fixed to the girder and this shaft is coupled with the vertical shaft 42 of the filling device by means of a pair of bevel wheels 118, only partially drawn. The shaft 117, acting through worm gears 131, 132, 133, drives the shafts 120, 127 and 121 of chain wheels 100, 107 and 101. On the lower section of the crosspiece girder 11 is situated a second horizontal shaft 119, which is coupled with the upright shaft 26 of the weaving loom through a pair of bevel gear wheels 134. The horizontal shaft 119, through two worm gears 135 and 136, drives the shafts 126 and 122 of chain wheels 106 and 102. Chain wheels 100, 101, 102, 106 and 107, are thus rotated continuously and consequently continuously move on those parts of the conveyor chains 95 which are for the time being in engagement with them.

The shaft 128 which is supported in the two arms 12 of the crosspiece and which carries the chain wheels 108 has an intermediate shaft 137 associated with it, which is supported in the above mentioned arms and is turned by means of an endless chain 138 by the main shaft 36 of the filling mechanism. The intermediate shaft 137 drives the chain wheel shaft 128 through a controlling mechanism consisting of a switching arm 139 with a ratchet wheel and cross wheel 140 (see Figs. 1 and 2). In a similar way, the shaft 124 situated in the arms 13 of the loom frame and bearing the chain wheels 104 is driven by an intermediate shaft 141 placed close to it, through a controlling mechanism consisting of a switching arm 142 with a ratchet wheel and cross wheel 143. The shafts 123, 125 in the brackets 5, carrying chain wheels 103 and 105, are driven from the chain wheel shaft 124 through the two endless chains 144, 145.

As can be seen the arrangement of the Geneva drive 139, 140 and 142, 143 means that the chain wheels 108 and also the wheels 103, 104, 105, in contrast to the other chain wheels, are not rotated continuously but intermittently, remaining stationary for a short time after each partial rotation. Consequently the parts of the conveyor chains 95 which are affected by them also advance intermittently and remain stationary for a short time after each advance. To compensate the variations in the type of movement in different parts of the conveyor chains, an automatic compensation device in the form of two pairs of chain wheels 146 acting as tension pulleys has been fitted for the loops 113 which form between chain wheels 100 and 107. The axles of these pairs of wheels are fitted, by means of rollers 148 attached to their ends (Fig. 2), into a guide channel formed from two angle bars 149 fixed to the arms 12, so that they can be rotated and moved along and they are connected by a telescopically extending rod 150. There is a helical compression spring 151 to every connecting rod 150 and this tends to urge the two axles 147 apart. Consequently the two pairs of chain wheels 146 push the shanks of the loops 113 formed at the filling device by the conveyor chains further away from each other, with the result that they compensate the variations in length of the shanks of the loops 113, due to the intermittent rotation of the pair of chain wheels 108, in such a way that the loop shanks are bent outwards to a greater or lesser degree.

In the case of the loops 115 in the chains 95 formed between chain wheel pairs 103 and 105 the compensation is achieved differently, in that the parts of the chains 95 between chain wheels 102 and 103 and those between chain wheels 105 and 106 do not follow a straight course but hang down a little. Consequently the length of these chain sections can lengthen or shorten alternately, to correspond with the advance of the chains 95 whether it is intermittent or continuous, by an increase or decrease in the extent to which they hang down.

As can be seen the conveyor chains 95 are moved onwards partly by the main shaft 36 of the filling device B and partly by the main shaft 14 of the weaving loom A. In conformity with the appropriate choice of gear ratios for the gears driving the shafts of chain wheels 100—108, during each revolution of the main shaft 36 of the filling device B the parts of the conveyor chains driven by chain wheels 100, 101, 107, 108 will move forward sometimes continuously and sometimes intermittently, while on the other hand, during each revolution of the main shaft 14 of the weaving loom A the sections of the conveyor chains driven, partly continuously and partly intermittently, by chain wheels 102, 106 and 103—105 will move forward a certain amount, this amount being equal to the centre-to-centre distance of the gripper frames 72 which are disposed in uninterrupted sequence on the carrier chains 95. If both the loom and the filling device are in operation and if the speed of the filling device is the same as that of the loom, all the gripper frames conveyed by the conveyor chains 95 will be moved on by an amount corresponding to the centre distance of two gripper frames during one revolution of the two main shafts 14 and 36. The conveyance of gripper frames which are either at the filling device B or the weaving loom A proceeds intermittently and these gripper frames remain stationary during the intervals between the switching movements. These stationary periods permit either the removal at point c of gripper frames to be filled with tuft yarns from the filling device and/or removal of the filled gripper frames at the weaving loom at the point d so that the tufts of yarn it contains may be passed into the fell of the carpet being woven. As already mentioned, the chains 95 run in the direction of the arrows f shown in Fig. 1. Thus, gripper frames which have been replaced in the conveyor chains after being filled are conveyed along a course marked by the chain wheels 107, 110, 106, 105 and 104 to the weaving point, while those which are returned to the chains after removal of their tufts are taken back to the filling point by way of chain wheels 104, 103, 102, 109, 101 and 100.

As already mentioned, both the filling device B and the weaving loom A are fitted with a lever system for removing gripper frames from the conveyor device, i.e. the chains 95, when they require filling or emptying and for replacing them after completion of the operation. The lever system associated with the filling device, which is indicated as a whole by 165 and is illustrated separately in Figs. 7 and 8 is arranged as follows:

As the end of the crosspiece 10 facing the filling device B there is an axle 166 rotatably journalled in bearings 168 and carrying adjacent its ends two lever arms 167, joined by the axle so as to move together. The two arms 167 can be rocked backwards and forwards alternately in the direction of the chain wheels 108 and in the direction of the filling device, the movement being transmitted through a rod 169 one end of which engages with one of the arms 167 and the other, which is fitted with a roller, works in conjunction with an eccentric or cam 170 fixed on to the main shaft 36 of the filling device B. Movement in the first named direction is positive, by means of cam 170 and rod 169, while the opposite movement is negative, through a spring 171, one end of which is fastened to the arm 167 and the other to the frame 6 of the filling device. At the free end of each arm 167 is a two-armed lever 172, 173 fulcrumed on an axle 174 perpendicular to the axle 166 in such a manner that its arm 173 is practially an extension of the supporting lever arm 167. The arms 173 of levers 172, 173 each have at the free end a U-shaped claw 177 (see also Figs. 4 and 6) which is adjustable and held in place by means of a plug 175 and bolt 176. The claws 177 which fit on to the projections 87 on the end pieces 73 of the gripper frames 72 are designed so as to take hold of the gripper frames as these arrive at the point c and to effect this action they are pushed over the projections 87 of the head pieces 73 of the frame 72 from the front sides by the corresponding rocking movement of the levers 172, 173. To stop the gripper frame dropping out of the claws 177 these are fitted with two retaining pins 172 each which also serve to align the gripper frame when it has been taken up by the claws. Then, when the lever arms 173 are brought together for the lifting of the gripper frame, the retaining pins 178 enter the drilled holes in the bolts 75 which fix the head pieces 73 of the gripper frames to the axles 74. Finally, each claw 177 has a thrust bolt 180. These two thrust bolts 180 are for disengaging the two locking bars 90 which secure the gripper frames 72 from accidental release from the conveyor chains 95. When a gripper frame is grasped by the claws 177 the bolts 180 press against the spring bars 90 which constitute the locking bars, forcing them back, so that their bent up ends 91 are released from the links of the chains and thus the gripper frame can be removed from the chains 95. It is advisable for the thrust bolts 180 to be movable within a limited extent and they are each therefore acted on by a spring 181 which pushes them forward so that if necessary they can yield a little. In a similar way the retaining pins 178 are best designed to move slightly and are held forward by springs 179.

On the arm 173 of each lever 172, 173 there is a second two-armed lever 182, 183 which is pivoted about an axle 184 parallel to the axle 166. These open the grippers 76 of the gripper frame which has been grasped by the claws 177 of the levers 172, 173. At the free ends of their arms 183 are fingers 185 extending parallel to the axle 166. When a gripper frame 72 is taken up by the claws 177, the two fingers 185 come to rest one each on the outer side of one of the two toggle levers 84 so that they are able to exert pressure on the latter in the direction which closes the grippers 76. The closing operation does no occur, of course, until the grippers have been presented to the filling point a.

Figure 4:
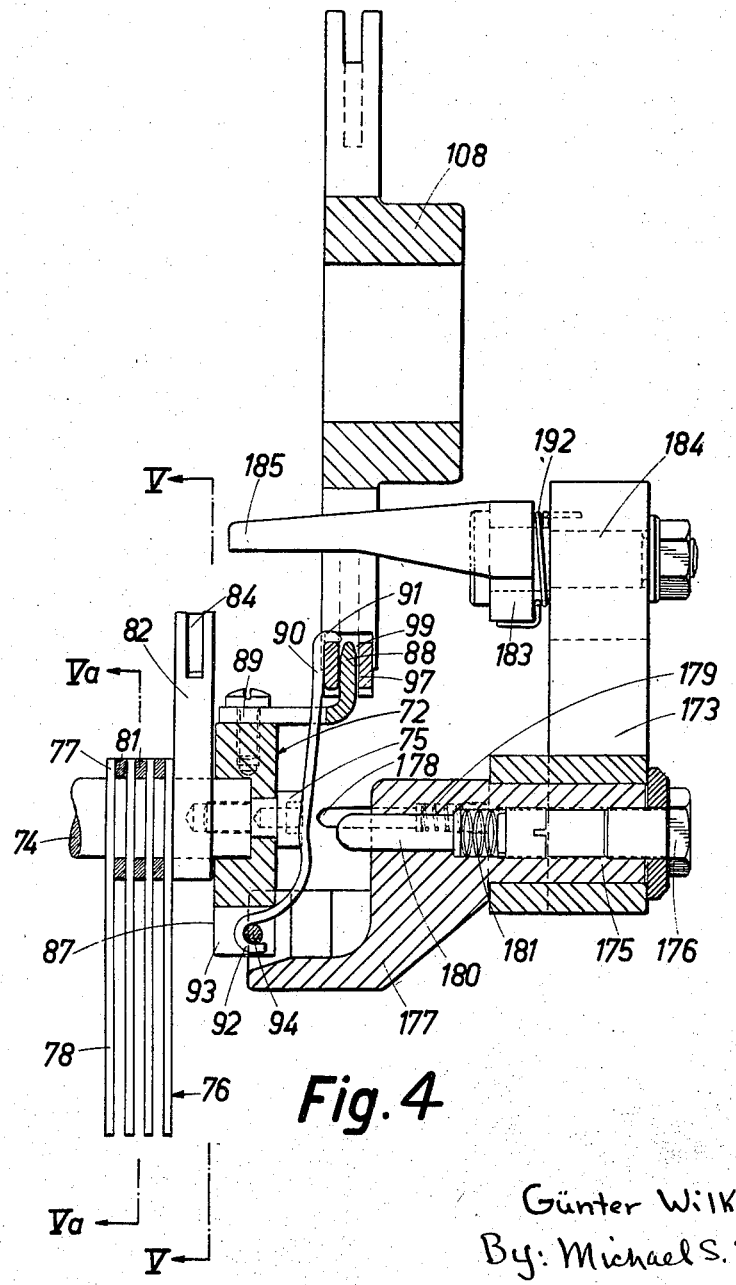
Fig. 4 is a section along line IV—IV of Fig. 3.

The two-armed levers 172, 173 and 182, 183 are moved by means of a tubular shaft 186 rotating about the axle 166 and turned through a chain drive 187 from the main shaft 36 of the filling device B at the same speed as the latter. At each end of the tubular shaft 186 is a cylindrical body 188 consisting of a combined cam groove and cam plate, the cam groove being in the part nearest to the arm 167, or the outer part, while the inner part carries a lifting cam 190. The arms 172 of the gripper-holding two-armed levers 172, 173 on the side nearest the axle 166 engage in the cam grooves 189 each by means of a pin 191 so that these levers can be operated by the cam groove. The arms 182 of the two-armed levers 182, 183, however, are actuated by the two lifting cams 190. The lever arms 182 are each pressed against the corresponding cam body 188 by a spring 192 (Fig. 4).

The lever system described operates as follows: when not operating, the lever system 165 is in a position where the two claws 177 are adjusted to the gripper frame 72 which is at that time at the point c but its head pieces are not touched by the claws, so there is nothing to prevent the grippers from being conveyed onwards by the conveyor chains 95. When the section of the chains 95 passing round chain wheels 108 stops during the intervals of the Geneva drive 139, 140, the lever arms 173 are moved over towards the head pieces 73 of the gripper frame which is at the point c, so that this frame is taken up by the claws 177 and the retaining pins 178, while simultaneously the thrust bolts 180 disengage the locking bars 90. The whole lever system is now rocked about the axle 166 in the direction of the filling device by the cam plate 170 on the main shaft 36 with the result that the gripper frame 72 which is moved along by the levers arrives at the filling point a. This brings the grippers over the ends of the tuft yarn prepared for withdrawal and projecting slightly from the appropriate thread guides. The cam 190 on the control 188 now turns the levers 182, 183 with the result that, through pressure of the fingers 185 on the toggle lever 84, the grippers 76 are closed. After the grippers have thus taken hold of the ends of the yarn, the lever system is rocked back in the direction of chain wheels 108, by means of a correspondingly ascending part of the cam plate 170, by an amount equal to the length of the pieces of yarn to be withdrawn, whereupon the gripper system halts for a short time and the lengths of thread withdrawn from the thread guides are cut off by the shears 39. When this operation is complete the lever system is returned to its initial position by means of the cam plate 170 which is specially constructed for this and the gripper frame, now filled with yarn tufts, is replaced in the conveyor chains 95, the flat tongues 88 on its end pieces 73 engaging once more in the pockets 99 which are formed in the chains 95. Now, while the arms 167 remain stationary, the two two-armed levers 172, 173 are rocked by means of the cam grooves 189 so that their arms 173 are removed from the head pieces of the gripper frame 72. The thrust bolts 180 now release the locking bar 90 which returns to the locking position securing the gripper frames on to the chains 95. The retaining pins 178 are also withdrawn from the holes in the bolts 75 and the claws 177 are pulled off the projections 87 on the head-pieces of the gripper frame 72, thus releasing from the lever system 165 the gripper frames which are replaced in the conveyor chains 95. Fig. 1 shows the lever system 165 in an intermediate position where it is just about to move into its initial position. The lever system 265 associated with the weaving loom A (see Figs. 1 and 9, 10) is, apart from certain variations, of the same design as the lever system 165 just described in association with the filling mechanism B. On an axle 266 pivoted in the weaving loom frame 3 are fixed two arms 267, each carrying two two-armed levers 272, 273 and 282, 283, the first of which is pivoted on the arm 267 about an axle 274 which is at right angles to the axle 266, while the second is pivoted on the arm 273 of the levers 272, 273 about an axle 284 which is parallel to the axle 266. The levers 272, 273 each have at the end of their arm 273 a U-shaped claw 277 with a pair of retention and centring pins like the previously described pins 178 and also a thrust bolt like the one described earlier, that is to say, they correspond in arrangement and function in every respect with the levers 172, 173 of the lever system 165 associated with the filling mechanism B. The levers 182, 183 also have at the end of their arm 183 a finger 285 which works with the toggle lever 84 of the gripper frame. As a variation from the lever system associated with the filling mechanism, the arms 283 of the levers 282, 283 are somewhat different in shape from the lever arms 183 so that the fingers 285 extend to the inner side of the toggle lever 84 when a gripper frame is grasped by the claws 277 and they are therefore in a position where they can operate the toggle levers to open the grippers 76.

Like the lever system for the filling mechanism, the lever system 265 is operated in one direction through a thrust rod 269 and an eccentric or cam plate 270 situated on the main shaft 14 of the weaving loom while in the other direction it is moved by means of a tension spring 271. The two-armed levers 272, 273 and 282, 283 are moved by means of two controls 288 fitted with a cam groove 289 and a lifting cam 290, the controlling members being fixed to a tubular shaft 286 which rotates round the axle 266. This shaft 286 is rotated by a chain wheel 287a, see Fig. 9, which is part of a chain drive 287 from the shaft 141, see Fig. 1a, carrying the member 142 of the Geneva drive 142, 143 which moves the chain wheels 104. The movement of the two-armed levers 272, 273 by means of the cam grooves 289 corresponds with the movement of the levers 172, 173 in the lever system 165. As regards the levers 282, 283 there is a variation from this system in that they are operated in the opposite direction from the levers 182, 183, that is to say their fingers 285 press against the toggle lever 84 from inside, thus opening the grippers 76.

When not in operation, the lever system 265 is in such a position that the claws 277 are sideways on to the head pieces 73 of the gripper frame 72 which is located at the apex of the loops 115 of the conveyor chains 95 passing round the chain wheels 104, at the point $d$ which is empty in Fig. 1. When the section of the chains 95 which is passing round the chain wheels 104 stops temporarily, the two-armed levers 272, 273 are operated so that their arms 273 move towards the end pieces 73 of the gripper frame and release the latter from its locking mechanism in the same way as was described previously for lever system 165. The lever system 265 then swings down and brings the frame 72 with the filled grippers 76 to the weaving point where the grippers insert the lengths of tuft yarn which they have been carrying into the warp forming the weaving shed 19. When the tufts which have been put into the warp have been fixed by the insertion of one or two shots, the grippers 76 are opened by means of the fingers 285 and the lever system 265 then swings up and back to the starting position in order to replace the emptied gripper frame in the chain 95. Finally the claws 277 and their retaining pins release the gripper frame again, while the locking bar 90 once more secures it to the chains 95. Fig. 1 illustrates an intermediate position of the lever system 265 which is passed through in the return to the starting position. Let it be assumed that the main shaft 14 of the weaving loom A and the main shaft 36 of the filling mechanism B both rotate at the same speed. Then during one cycle of operations of the weaving loom and the filling device the following processes occur. In the filling mechanism B a row of tuft yarns are selected and placed ready to be taken by a row of grippers, then a gripper frame which has been taken off the conveyor chains 95 at the point $c$ is filled with yarn tufts and immediately replaced in the chains 95. At the weaving loom, after the last weft, or single shot, has been beaten up after insertion, a new shed is formed and then the tuft lengths from a gripper frame, removed from the conveyor chains 95 at the point $d$, are inserted in the warp and fastened there, whereupon the grippers 76 of the gripper frame are opened and the frame is replaced in the conveyor chains 95. These chains which, during each cycle of operation of the weaving loom and the filling mechanism, are moved on by an amount equal to the distance between centres of two consecutive gripper frames 72, convey the filled gripper frames from the filling device B to the weaving loom A, while at the same time they return the emptied gripper frames from the weaving loom to the filling device. It is obvious at once that the gripper frames 72 are removed from the carrier chains 95 at the weaving loom A and taken to the weaving point in precisely the same sequence as that in which they had been filled at the filling mechanism B. Thus the rows of tufts are inserted in the carpet which is in course of weaving in conforty with the pattern determined by the perforations in the Jacquard cards in the selection and filling device B, so that the required pattern is reproduced in the carpet.

Naturally it is only possible for the three machines, viz. the filling device, the conveyor mechanism and the weaving loom to function continuously in the manner just described as long as there are no breakdowns. In practice, however, there are frequent interruptions, either through the breaking of yarn in the filling machine or the weaving loom or through the fact that the bobbins supplying the tuft yarn or the weft bobbins become empty and have to be changed. For the rectification of the fault the filling mechanism or the weaving loom must be stopped for a time and this usually happens automatically by means of the well known stop motion. With a conveyor mechanism of the normal construction, which is driven in its entirety from one point, e.g. solely from the shaft of the weaving loom, a temporary stoppage of the filling mechanism would involve a stoppage of the loom also, until the fault in the filling machine had been corrected, which would of course result in a considerable drop in production. The invention aims at eliminating this drawback in that, during a temporary stoppage of the filling device the weaving loom can continue to operate for a limited period, in most cases long enough for a broken yarn to be dealt with or an empty bobbin to be exchanged. To achieve this it is necessary to have a reserve of gripper frames filled with yarn tufts kept in the conveyor system. Provision is also made for the filling mechanism to continue running if the weaving loom stops temporarily, so that the reserve supply of filled gripper frames can be replenished if necessary, if it has been used up. The gripper frames which will be filled up in this case are taken from a reserve of empty gripper frames, which had been similarly accumulated during the preceding sole running of the loom within the conveyor system from the gripper frames which come from the weaving loom.

This object is achieved by means of the following arrangements, most of which have been described already, the first being that whereby the conveyor chains 95 are not driven from one single point but partly from the filling device and partly from the weaving loom. In this way it is possible, if the filling device stops, for the part of the carrier system driven by the weaving loom to continue to operate in conjunction with the machine which is still working and if the weaving loom stops the part of the conveyor system driven by the filling device can continue with the remaining operating machine. Secondly: The two horizontal loops 114 and 116 formed by their passage round the movable pair of chain wheels 109, 110, of which the left loop 114 is in the part of the conveyor chains running from the filling device to the weaving loom and the right hand loop 116 is in the part of the conveyor chains 95 returning from the weaving loom to the filling device. The two loops 114, 116 represent what may be termed reservoirs or storage depots in which, through variations in the loop lengths, a reserve supply of gripper frames can be stored up and passed out again. The left hand loop 114 will build up a supply of filled frames and the right hand loop 116 one of empty frames. When a supply of filled gripper frames is being built up the left hand loop 114 will become longer and with a supply of empty frames the right loop 116 will lengthen. The lengthening of one loop is accompanied by a corresponding shortening of the other. According to the change in loop length the two pairs of chain wheels 109, 110 which can move along the crosspiece 10 move either to the right or the left. This move is caused by the tension in the shortening loop. Figs. 11 and 12 illustrate two limit cases of reserve formation. In Fig. 11 the reservoir for filled gripper frames, i.e. loop 114 is at its longest, while the left hand loop 116 is shortened to zero, that is it has practically disappeared. In Fig. 12 the position is reversed: The right hand loop 116 is at its longest while the left hand loop is reduced to zero. Of course it is possible for every intermediate stage between the illustrations in Figs. 11 and 12 to occur in the course of operations.

The third arrangement which contributes to the goal already referred to is the electromagnetically controlled change speed gear 41 already described, by which it is possible for the filling device B, and hence also the section of the conveyor system C dependent upon this, to be driven at a speed higher than the normal. The change speed gear 41 is controlled, as described earlier, by means of a reversing switch. This reversing switch is located on the crosspiece 10 which carries the conveying mechanism and is placed at a little distance from the right hand end. It is operated by a catch which is fitted on to the carriage 112 for the movable chain wheels. When the movable chain wheels travel towards the right hand end of the crosspiece 10 owing to the filling up of the reserve formed by loop 114 the reversing switch, approximately at the moment when the loop 114 is three quarters of its greatest possible length (this could be sooner if required, e.g. two thirds of the maximum loop length), is thrown over to the position opposite to that shown in Fig. 13, in which the change speed gear 41 is switched to normal operation. If, through emptying of the reserve, i.e. the shortening of loop 114, the chain wheels 109, 110 travel back to the left, the switch is put into the position shown in Fig. 13 where the variable gear is switched on to increased speed.

Let us assume that the left hand reserve 114, for the filled gripper frames, has become stretched to more than three quarters (or two thirds where this applies) of its greatest length. The weaving loom A and the gripper filling mechanism B are then running at the same speed and the sections of the carrier chains 95 connected with them convey the gripper frames 72 which they are carrying at the same rate of advance. The machinery then operates just as has been described earlier in the course of the description of the lever systems 165 and 265. Now, if through the breaking of a yarn or the emptying of a yarn bobbin, there is a stoppage of the filling device B and the associated section of the conveyor chain, it will not be necessary for the weaving loom A also to stop, because there is a reserve of filled gripper frames in the loop 114 of the chain. Thus the loom continues to run productively, while the section of the carrier chains 95 driven in association with the weaving loom continues to run so as to supply the loom with the filled gripper frames which it requires for its operation. What makes this possible is the fact that, on the side of the conveyor system containing the filled gripper frames, between the sections dependent on the filling machine and the weaving loom, respectively, there is the left hand reserve loop 114. As the loom continues to operate this loop gradually shortens and by degrees passes on the reserve of filled gripper frames which it contains. Since the two pairs of movable chain wheels 109, 110 travel to the left, the shortening in the loop 114 is accompanied by a corresponding lengthening in the right hand chain loop 116, which, as can be seen, is located on the side conveying the emptied gripper frames, between the section of the conveyor system dependent on the weaving loom and that dependent on the filling machine. Thus the lengthening right-hand reserve loop 116 is in a position to store up the emptied gripper frames coming from the weaving loom as it continues to operate, so that the right hand store fills up to the same extent as the left hand reserve empties.

If the interruption in the filling mechanism is dealt with and the machine is not going again before the reserve of filled gripper frames is completely used up, then the filling device B will at first run at a greater speed than the loom and the section of the conveyor system associated with the filling device will also run faster than the section associated with the weaving loom, this being due to the movement to the left of the movable chain wheel pairs 109, 110 which switched the change speed gear 41 on to increased speed by the operation of the switch 50. In consequence of this, in one unit of time there will be more gripper frames supplied with tuft lengths from the filling mechanism than are emptied by the weaving loom. This is possible because now, through the pull of the section of the conveyor system associated with the filling mechanism and running faster, the right hand reserve loop 116 shortens and gradually passes out the reserve of emptied gripper frames which it contains. On account of the rightward movement of the travelling pairs of chain wheels, the shortening of the right hand reserve loop 116 leads to a corresponding lengthening of the left hand reserve loop 114, so that this loop can store up the filled frames coming from the filling mechanism in excess of the current need of the weaving loom. Thus a fresh reserve of filled gripper frames is built up in this loop. As soon as the reserve loop 114 is about three quarters full the throw-over switch 50 for the change speed gear 41 is operated by the catch provided for this purpose on the carriage of the pair of chain wheels. The filling mechanism and the associated section of the conveyor system are thus switched to the normal speed and the filling device and the weaving loom are now running at the same working speed.

It may happen now and then that the stoppage of the filling device due to a breakdown such as a broken yarn, etc., may last somewhat longer and consequently the reserve of filled gripper frames in the reserve loop 114 is not sufficient to bridge the period of stoppage of the filling device. In such a case the weaving loom must be stopped as soon as the reserve of filled gripper frames is used up. This stopping is carried out automatically by the switch 63 which has already been referred to. This is placed on the crosspiece 10 so that it is operated by a stop catch on the carriage of the moving pairs of chain wheels 109, 110 when the chain wheels 109, 110 reach the left hand limit of their travel (Fig. 12). When this happens, the switch 63 opens the circuit of the coil 56 of the switch 54 of the loom motor, thus stopping the latter. The restarting of the weaving loom after it has been stopped because of failure of the reserve of filled gripper frames takes place automatically when the fault in the filling mechanism has been corrected and the mechanism has been started up again by operation of the hand switch 160. The automatic restarting of the weaving loom is effected by means of the already mentioned control switch 61 which is placed on the crosspiece 10 at a certain distance from the left hand end of the path of the movable pairs of chain wheels 109, 110. When the filling mechanism has been started up again it starts to build up a new reserve of filled gripper frames, because the weaving loom is still not operating, and the left hand reserve loop 114 is lengthened while simultaneously the right hand reserve loop is shortened. In this process the carriage 112 of the travelling chain wheels 109, 110 again moves to the right. First it releases the switch 63 which closes again, whereupon a stop which is fitted on it actuates the control switch 61 as it passes along, thus supplying current to the coil 56 of the switch 54 of the loom motor 17 and switching on this motor. Thus the weaving loom now also runs and the entire system is again in full operation, but it should be noted that the filling mechanism runs at higher speed until, when a new reserve of filled gripper frames has been built up, the change speed gear is switched to normal speed by the throw-over switch 50.

It should further be stressed here that, owing to the fact that the switch 63, which is operated for the automatic switching off of the loom, is held by the carriage 112 of the slidable pairs of chain wheels 108, 110 in the open position until the carriage 112, which travels to the right after the filling device has been put in operation again, has freed it again, the loom is prevented from being switched on again by hand at the wrong moment through erroneous operation of the push-button switch 60.

If there is a breakdown in the weaving loom A through the breaking of a yarn or the emptying of a weft bobbin, so that the stop motion brings the loom to a standstill, the filling device B and the associated section of the conveying device C continue to operate at first, this fact being utilized for the filling up of the reserve 114 which may not have been completely full. As the filling device continues to run the right hand reserve loop 116 becomes shorter, while the length of the left hand reserve loop 114 increases in proportion. As soon as this brings the carriage 112 of the movable pairs of chain wheels 109, 110 to the right hand limit of its travel the motor 40 of the filling mechanism is automatically switched off by the previously mentioned switch 163, situated at the right hand end of the crosspiece 10 in such a position that it is actuated by a catch on the carriage 112 of chain wheels 109, 110 as this reaches its right hand limit. When operated in this way the switch 163 opens the circuit of the magnet coil 156 of the switch 154, thus switching off the motor 40 of the filling device. This machine is switched on again automatically as soon as the weaving loom is switched on again by means of the hand-operated switch 60, when the fault in the loom has been remedied. The automatic restarting of the filling device is effected by the previously mentioned control switch 161 on the crosspiece 10 at a short distance from the right hand end, operated by means of the carriage 112 of the travelling pair of chain wheels 109, 110. If the loom starts up again while the filling mechanism is still idle, the left hand reserve loop 114 shortens while the right hand reserve loop 116 lengthens. Therefore the carriage 112 travels to the left, first releasing the switch 162, whereupon the catch with which it is fitted actuates the control switch 161 as it passes, thus closing the circuit of the magnet coil 156 and consequently switching on the motor 40 of the filling device again. Now, therefore, both the weaving loom and the filling mechanism are operating together and the conveyor system is running as an entire unit.

It should also be stressed here that, owing to the fact that the switch 163, which is operated for the automatic disconnection of the filling device, is held by the carriage 112 of the slidable pairs of chain wheels 108, 110 in the open position until the carriage 112 which travels to the left after the loom has been put in operation again, has released it so that it can return to its position of rest, the filling device is prevented from being switched on again by mistake and at the wrong moment by operation of the push-button switch 160.

It will be seen from the foregoing description that the two reserve loops 114 and 116 do not merely build up alternately a reserve of filled or empty gripper frames, but also help to compensate for differences in the movement of sections of the conveyor chains 95 associated with the filling mechanism and the weaving loom. This is important because, with an arrangement comprising two separate and independently switched on driving motors, even when the filling mechanism and the loom are running at the same speed, it may happen that the cycle of operations of the one machine may shift more or less with respect to the cycle of operations of the other machine, with the result that the stops for the removal of a gripper frame for filling or emptying which are made by the sections of the carrier chains passing round chain wheels 108 and 104 do not occur at the same time. There is moreover the possibility that, even if the change speed gear 41 is switched to normal speed, the speed of the filling device does not coincide quite precisely with the speed of the weaving lom. Every variation in the movement of the sections of the conveyor chains governed by the filling mechanism on one hand and the weaving loom on the other which may arise from these circumstances is compensated by the loops 114 and 116 through the fact that one loop can lengthen at the expense of the other, to a predetermined extent.

The invention is not limited to the particular embodiments described and illustrated. Many modifications and variations are possible within the scope of the appended claims. Thus, for example, the conveyor device may comprise two chutes, acting on the principle of the so-called gravity magazines, one of which is inclined from the filling device down towards the weaving loom for conveying the rows of filled grippers to the weaving loom, while the other chute is inclined downwardly towards the filling device for returning the empty rows of grippers to the filling device. At the weaving loom is a lifting device connecting the lower end of the first chute with the upper end of the second so that it brings the empty grippers on to the second chute, thereby constituting once more a circulatory conveyor device. The frames containing the grippers are carried down the chutes under their own weight so that no special driving means are required for the chute system. Each chute can take a fairly large number of gripper frames, so that, according to the state of operations, there is either a reserve of frames with filled grippers being built up in the first chute or a reserve of gripper frames with empty grippers forming in the second chute. Thus the two chutes, like the two loops 114 and 116 of the conveyor chains 95 in the embodiment previously described and illustrated, form alternately filling and emptying magazines or reservoirs, whereby it is possible to allow the weaving loom to continue operating if there is a breakdown in the filling device and conversely the filling device in the event of a breakdown in the weaving loom. Moreover, for rapid refilling of the magazine formed by the first chute, the filling device can be run for a while at an increased speed. The two chutes may each basically consist, for example, of two facing guides, which may be U-shaped and in which the gripper frames slide with their end or head pieces. The lifting mechanism which connects the lower end of the first chute with the upper end of the second chute can consist of a pair of endless chains and can be driven from the weaving loom.

I claim:

1. Apparatus for the manufacture of tufted carpets comprising, in combination, a filling device for supplying tufts; a loom for weaving a tufted carpet; gripper transporting means for transporting grippers along an endless path from said filling device to said loom and from said loom to said filling device; first gripper operating means located at said filling device for filling tufts into grippers transported by said gripper transporting means; drive means for driving said first gripper operating means independently of said loom; second gripper operating means located at said loom and being driven from the same for effecting emptying of said grippers by laying tufts into the fell of the carpet; and control means automatically responsive to a filled condition of said gripper transporting means for automatically stopping said drive means and thereby said first gripper operating means when said gripper transporting means is fully loaded with filled grippers.

2. Apparatus for the manufacture of tufted carpets comprising, in combination, a filling device for supplying tufts; a loom for weaving a tufted carpet; gripper transporting means for transporting a plurality of rows of grippers along an endless path from said filling device to said loom and from said loom to said filling device; first gripper operating means located at said filling device for filling tufts into successive rows of grippers transported by said gripper transporting means; drive means for driving said first gripper operating means independently of said loom; second gripper operating means located at said loom and being driven from the same for effecting emptying of successive rows of said grippers by laying tufts into the fell of the carpet; control means automatically responsive to a filled condition of said gripper transporting means for automatically stopping said drive means and thereby said first gripper operating means when said gripper transporting means is fully loaded with filled grippers; and other control means automatically responsive to a filled condition of said gripper transporting means for stopping said second gripper operating means when said gripper transporting means is fully loaded with empty grippers.

3. Apparatus for the manufacture of tufted carpets comprising, in combination, a filling device for supplying tufts; a loom for weaving a tufted carpet; gripper transporting conveyor means for transporting a plurality of grippers along an endless path from said filling device to said loom and from said loom to said filling device, said gripper transporting conveyor means including a plurality of frames, each frame holding one row of grippers; first gripper operating means located at said filling device for moving each of said frames from said conveyor means to said gripper device and back to said conveyor means, and for filling tufts into successive rows of grippers transported by said gripper transporting means; drive means for driving said first gripper operating means independently of said loom; and second gripper operating means located at said loom and being driven from the same for moving each of said frames from said conveyor means to said loom and back to said conveyor means and for effecting emptying of successive rows of said grippers by laying tufts into the fell of the carpet.

4. Apparatus for the manufacture of tufted carpets comprising, in combination, a filling device for supplying tufts; a loom for weaving a tufted carpet; gripper transporting means for transporting grippers along an endless path from said filling device to said loom and from said loom to said filling device, said gripper transporting means including storing means for storing grippers; first gripper operating means located at said filling device for filling tufts into grippers transported by said gripper transporting means; drive means for driving said first gripper operating means independently of said loom; and second gripper operating means located at said loom and being driven from the same for effecting emptying of said grippers by laying tufts into the fell of the carpet so that grippers filled by said first gripper operating means are stored in said storing means when said second gripper operating means do not empty as many grippers as are filled, and so that grippers emptied by said second gripper operating means are stored in said storing means when said first gripper operating means do not fill as many grippers as are emptied.

5. An apparatus as set forth in claim 4 and including means for stopping each of said gripper operating means independently of the other of said gripper operating means so that said grippers can be filled during stoppage of said loom, and so that said grippers can be emptied during stoppage of said filling device.

6. An apparatus as set forth in claim 4 wherein said drive means include variable transmission means for driving said first gripper operating means at different speeds, one of said speeds corresponding to the speed of said second gripper operating means and to the speed of said loom, and at least one other of said speeds being higher so that a greater number of grippers is filled than is emptied and filled grippers are accumulated in said storing means of said gripper transporting means.

7. An apparatus as set forth in claim 4 and including control means automatically responding to a filled condition of said storing means for stopping said drive means of said first gripper operating means when said storing means is filled with filled grippers.

8. An apparatus as set forth in claim 4 and including control means automatically responding to a filled condition of said storing means for stopping said second gripper operating means when said storing means is filled with empty grippers.

9. An apparatus as set forth in claim 4 and including control means for automatically stopping said drive means of said first gripper operating means when said storing means is filled with filled grippers and for automatically starting said drive means when the number of filled grippers in said storing means is reduced by operation of said second gripper operating means; and other control means for stopping said loom when no filled grippers are in said storing means and for starting said loom when said first gripper operating means operate, both said control means being responsive to the condition of said storing means.

10. An apparatus as set forth in claim 4 wherein said drive means includes variable transmission means for driving said first gripper operating means at different speeds, one of said speeds corresponding to the speed of said loom, and at least one other of said speeds being higher so that a greater number of grippers is filled than is emptied and filled grippers are accumulated in said storing means of said gripper transporting means; and automatic control means for driving said first operating means at said higher speed of said variable transmission means when said storing means is filled with empty grippers.

11. Apparatus for the manufacture of tufted carpets comprising, in combination, an endless conveyor defining an endless path; a filling device for supplying tufts located along said endless path; a loom for weaving a tufted carpet located along said endless path; a plurality of frames releasably supported on said endless conveyor, each of said frames including a row of grippers; a first operating means located at said filling device for successively moving said frames from said conveyor to said filling device and back to said conveyor, said first operating means including first gripper actuating means actuating the respective row of grippers to be filled at said filling device; drive means for driving said first operating means and said first gripper actuating means independently of said loom; and second operating means for successively moving said frame from said conveyor to said loom and back to said conveyor, said second operating means including second gripper actuating means actuating the respective row of grippers to be emptied at said loom, said second operating means and gripper actuating means being located at said loom and driven from the same.

12. Apparatus for the manufacture of tufted carpets comprising, in combination, an endless conveyor including endless belt means defining an endless path; a filling device for supplying tufts located along said endless path; a loom for weaving a tufted carpet located along said endless path; first means for intermittently driving said belt means from said filling device; second means for intermittently driving said belt means from said loom; a plurality of frames releasably supported on said endless conveyor, each of said frames including a row of grippers; a first operating means located at said filling device for successively moving said frame from said conveyor to said filling device and back to said conveyor, said first operating means including first gripper actuating means actuating the respective row of grippers to be filled at said filling device; drive means for driving said first operating means and said first gripper actuating means independently of said loom; and second operating means for successively moving said frames from said conveyor to said loom and back to said conveyor, said second operating means including second gripper actuating means actuating the respective row of grippers to be emptied at said loom, said second operating means and second gripper actuating means being located at said loom and driven from the same.

13. Apparatus for the manufacture of tufted carpets comprising, in combination, an endless conveyor including endless belt means defining an endless path; a filling device for supplying tufts located along said endless path; a loom for weaving a tufted carpet located along said endless path; first means for intermittently driving said belt means in a step-wise motion from said filling device; second means for intermittently driving said belt means in a step-wise motion from said loom; a plurality of frames releasably supported on said endless conveyor, each of said frames including a row of grippers; a first operating means located at said filling device for successively moving said frames from said conveyor to said filling device and back to said conveyor, said first operating means including first gripper actuating means actuating the respective row of grippers to be filled at said filling device; drive means for driving said first operating means and said first gripper actuating means independently of said loom; and second operating means for successively moving said frames from said conveyor to said loom and back to said conveyor, said second operating means including second gripper actuating means, said second operating means and second gripper actuating means being located at said loom and driven from the same.

14. Apparatus for the manufacture of tufted carpets comprising, in combination, an endless conveyor including endless belt means defining an endless path; a filling device for supplying tufts located along said endless path; a loom for weaving a tufted carpet located along said endless path; first wheel means intermittently driven from said filling device for driving a first section of said belt means adjacent said filling device in a step-wise motion; second wheel means intermittently driven from said loom for driving a second section of said belt means adjacent said loom in a step-wise motion; third wheel means for driving another section of said belt means in a continuous motion; a plurality of frames releasably supported on said endless conveyor, each of said frames including a row of grippers; a first operating means located at said filling device for successively moving said frames from said conveyor to said filling device and back to said conveyor, said first operating means including first gripper actuating means actuating the respective row of grippers to be filled at said filling device; drive means for driving said first operating means and said first gripper actuating means independently of said loom while said first section is at a standstill; and second operating means for successively moving said frames from said conveyor to said loom and back to said conveyor while said second section is at a standstill, said second operating means including second gripper actuating means actuating the respective row of grippers to be emptied at said loom, said second operating means and second gripper actuating means being located at said loom and driven from the same.

15. An apparatus as set forth in claim 14 wherein said belt means is a pair of endless chains, and wherein said wheel means include chain wheels meshing with said endless chains.

16. An apparatus as set forth in claim 14 wherein said first and second sections of said belt means are downwardly directed loops of said belt means, and wherein said first and second operating means respectively act on frames located at the ends of said loops, and wherein the main part of said belt means extends in horizontal direction.

17. An apparatus as set forth in claim 14 wherein each of said first and second operating means includes a pair of pivoted levers; means on said levers for holding said frames and for releasing said frames; and including cam means controlling said pivoted levers to move said holding means between said belt means and said filling device, and between said belt means and loom, respectively, and for operating said holding means to grip frames during transport away from and back to said belt means and to release frames returned to said belt means.

18. An apparatus as set forth in claim 17 wherein said belt means include a plurality of attaching means for respectively holding said frames on said belt means, and wherein said holding means have releasing means for releasing said attaching means said releasing means being controlled by said cam means.

19. An apparatus as set forth in claim 14 wherein said first operating means includes a pair of lever arms; a pair of double armed levers pivotally supported on said lever arms; a pair of holding means on said double armed levers for holding and releasing said frames, wherein each of said frames includes at least one operating member for opening and closing said gripper means; another pair of levers pivotally mounted on said double armed levers and engaging said operating means for opening and closing said gripper means; and cam means for operating said double armed levers and said other pair of levers and being driven from said drive means.

20. An apparatus as set forth in claim 14 wherein said second operating means includes a pair of lever arms; a pair of double armed levers pivotally supported on said lever arms; a pair of holding means on said double armed levers for holding and releasing said frames, wherein each of said frames includes at least one operating member for opening and closing said gripper means; another pair of levers pivotally mounted on said double armed levers and engaging said operating means for opening and closing said gripper means; and cam means driven from said loom for operating said double armed levers and said other pair of levers.

21. An apparatus as set forth in claim 11 wherein each of said grippers includes a pair of pivoted fingers, toggle lever means and spring means operatively connected to said fingers; and wherein each of said first and second gripper actuating means includes means acting on said toggle lever means for opening and closing said fingers.

22. An apparatus as set forth in claim 21 wherein each of said frames includes two end pieces and two shafts turnably supported in said end pieces, each shaft supporting one row of said fingers of the respective row of gripper means; and wherein said toggle lever means and spring means are connected to said shafts.

23. An apparatus as set forth in claim 22 wherein said first gripper actuating means act on the outside of said toggle lever means for closing said fingers of said gripper means, and wherein said second actuating means act on the inside of said toggle lever means for opening said fingers.

24. Apparatus for the manufacture of tufted carpets comprising, in combination, an endless conveyor including endless belt means defining an endless path; a filling device for supplying tufts located along said endless path; a loom for weaving a tufted carpet located along said endless path; first wheel means intermittently driven from said filling device for driving a first section of said belt means adjacent said filling device in a step-wise motion; second wheel means intermittently driven from said loom for driving a second section of said belt means adjacent said loom in a step-wise motion; third wheel means for driving another section of said belt means in a continuous motion; a plurality of frames releasably supported on said endless conveyor, each of said frames including a row of grippers; a first operating means located at said filling device for successively moving said frames from said conveyor to said filling device and back to said conveyor, said first operating means including first gripper actuating means actuating the respective row of grippers to be filled at said filling device; drive means for driving said first operating means and said first gripper actuating means independently of said loom while said first section is at a standstill; second operating means for successively moving said frames from said conveyor to said loom and back to said conveyor while said second section is at a standstill, said second operating means including second gripper actuating means actuating the respective row of grippers to be emptied at said loom, said second operating means and gripper actuating means being located at said loom and driven from the same; a carriage including pairs of wheels engaging said belt; and means supporting said carriage for movement so that during movement of said carriage in one direction a first loop is formed in said belt means in a section of said belt means located forwardly of said first section in direction of movement of said belt means, and so that upon movement of said carriage in opposite direction a second loop is formed in said belt means in a section of said belt means located forwardly of said second section of said belt means in direction of movement of said belt means, each of said loops increasing in length when the other of said loops decreases in length, said first loop storing frames with rows of filled grippers when more grippers are filled than emptied, and said second loop storing frames with empty grippers when more grippers are emptied than are filled.

25. An apparatus as set forth in claim 24 wherein said loop forming sections of said belt means are portions of said other section of said belt means which is driven in a continuous motion.

26. An apparatus as set forth in claim 25 wherein said loop forming sections extend in horizontal directions, and wherein said first and second intermittently driven sections of said belt means extend in downward direction toward said filling device and said loom, respectively.

27. An apparatus as set forth in claim 26 wherein said filling device has an operating side towards which said frames are moved by said first operating means; wherein said loom has an operating side toward which said frames are moved by said second operating means; and wherein said operating sides of said filling device and of said loom face each other.

28. An apparatus as set forth in claim 24 wherein said belt means is a pair of endless chains; wherein said first and second wheel means are chain wheels engaging said pair of chains; and wherein said wheels of said carriage are chain wheels engaging said pair of chains so that said carriage is moved by said pair of chains.

29. An apparatus as set forth in claim 28 and including a horizontal support supporting said pairs of wheel means, said horizontal support having a horizontal slot engaging portions of said carriage for guiding the same.

30. Apparatus for the manufacture of tufted carpets comprising, in combination, an endless conveyor including endless belt means defining an endless path; a filling device for supplying tufts located along said endless path; a loom for weaving a tufted carpet located along said endless path; first wheel means intermittently driven from said filling device for driving a first section of said belt means adjacent said filling device in a step-wise motion; second wheel means intermittently driven from said loom for driving a second section of said belt means adjacent said loom in a step-wise motion; third wheel means for driving another section of said belt means in a continuous motion; a plurality of frames releasably supported on said endless conveyor, each of said frames including a row of grippers; a first operating means located at said filling device for successively moving said frames from said conveyor to said filling device and back to said conveyor; said first operating means including first gripper actuating means actuating the respective row of grippers to be filled at said filling device; drive means including a first electric motor for driving said first operating means and said first gripper actuating means independently of said loom while said first section is at a standstill; second operating means for successively moving said frames from said conveyor to said loom and back to said conveyor while said second section is at a standstill, said second operating means including second gripper actuating means actuating the respective row of grippers to be emptied at said loom, said second operating means and gripper actuating means being located at said loom and driven from the same; a carriage including pairs of wheels engaging said belt means; means supporting said carriage for movement so that during movement of said carriage in one direction a first loop is formed in said belt means in a section of said belt means located forwardly of said first section in direction of movement of said belt means, and so that upon movement of said carriage in opposite direction a second loop is formed in said belt means in a section of said belt means located forwardly of said second section of said belt means in direction of movement of said belt means, each of said loops increasing in length when the other of said loops decreases in length, said first loop storing frames with rows of filled grippers when more grippers are filled than emptied, and said second loop storing frames with empty grippers when more grippers are emptied than are filled; a first circuit connected to said first electric motor of the drive means of said filling device; a second circuit including a second electric motor for driving said loom; first switch means connected into said first circuit and being operated by said carriage means for disconnecting said first electric motor in a position of said carriage means in which the maximum number of said frames is stored in said first loop; and second switch means connected in said second circuit and being operated by said carriage means for disconnecting said second electric motor in a position of said carriage means in which the maximum amount of empty grippers is stored in said second loop.

31. An apparatus as set forth in claim 30 including a variable transmission for driving said drive means, said first operating means and said first wheel means at a first lower speed corresponding to the speed of said second wheel means and of said loom, and at a second higher speed; and including other switch means operated by said carriage means and electrically connected to said transmission for operating said drive means and said first wheel means at said higher speed when said carriage is in a first selected position and for operating said drive means and said first wheel means at said lower speed when the maximum number of filled grippers is stored in said first loop.

32. Apparatus for the manufacture of tufted carpets comprising, in combination, a filling device for supplying tufts; yarn carriers for said filling device and adapted to be controlled by a Jacquard mechanism; a loom for weaving a tufted carpet; gripper transporting means for transporting grippers along an endless path from said filling device to said loom and from said loom to said filling device, said gripper transporting means including storing means for storing grippers; first gripper operating means located at said filling device for filling tufts into grippers transported by said gripper transporting means; drive means for driving said first gripper operating means independently of said loom; and second gripper operating means located at said loom and being driven from the same for effecting emptying of said grippers by laying tufts into the fell of the carpet so that grippers filled by said first gripper operating means are stored in said storing means when said second gripper operating means do not empty as many grippers as are filled, and so that grippers emptied by said second gripper operating means are stored in said storing means when said first gripper operating means do not fill as many grippers as are emptied.

References Cited in the file of this patent

UNITED STATES PATENTS

| | | |
|---|---|---|
| 1,651,809 | Crossland | Dec. 6, 1927 |
| 1,736,517 | Baker | Nov. 19, 1929 |
| 1,897,392 | Knowland | Feb. 14, 1933 |
| 1,909,113 | Lowe | May 16, 1933 |
| 1,970,524 | Knowland et al. | Aug. 14, 1934 |
| 2,551,080 | Allen et al. | May 1, 1951 |
| 2,650,695 | Robins | Sept. 1, 1953 |
| 2,817,365 | Barclay | Dec. 24, 1957 |

FOREIGN PATENTS

| | | |
|---|---|---|
| 685,182 | Germany | Dec. 13, 1939 |